United States Patent

Nadir et al.

[15] 3,646,273

[45] Feb. 29, 1972

[54] MULTIPLEX COMMUNICATION SYSTEM AND METHOD FOR MODIFYING SYSTEM BEHAVIOR

[72] Inventors: Mark T. Nadir, Warren; Carl N. Abramson, Sommerville, both of N.J.

[73] Assignee: Adaptive Technology, Inc., Piscataway, N.J.

[22] Filed: June 22, 1970

[21] Appl. No.: 48,096

Related U.S. Application Data

[63] Continuation-in-part of Ser. No. 861,947, Sept. 26, 1969.

[52] U.S. Cl. ....................................179/15 BA, 179/15 AL

[51] Int. Cl. ....................................H04j 3/00

[58] Field of Search ............179/15 A, 15 BA, 15 AP, 15 BY, 179/15 BC, 2 A, 2 AS, 15 AW

[56] References Cited

UNITED STATES PATENTS 2,920,143 1/1960 Filipowski ..........................179/15 BA 3,422,226 1/1969 Acs....................................179/15 BA

*Primary Examiner*—Kathleen H. Claffy

*Assistant Examiner*—David L. Stewart

*Attorney*—Kenyon & Kenyon Reilly Carr & Chapin

[57] ABSTRACT

An adaptive system is provided which is flexibly responsive to system behavior information, such as instructions, reports, remote maintenance and traffic flow, command transmission or reception, and data modification. The presence or nature of the system behavior directives is indicated by signals inserted in a system behavior portion of each of a series of periods (P). These system behavior signals in turn operate to modify or change the implicit or explicit meaning of the signals inserted within discrete subperiods located in a text portion of the same period (P). Also, text information is sent by assigning message meanings individually to each of such discrete subperiods, and inserting into selected ones of such subperiods signals identifying receiving and/or sending members of the system. The receiving member, in response to the signals within both the text portion and the system behavior portion, derives the message meanings corresponding to the received subperiods and modifies its behavior accordingly.

42 Claims, 14 Drawing Figures

INVENTORS
MARK T. NADIR
CARL N. ABRAMSON
BY Kenyon & Kenyon Reilly Carr & Chapin
ATTORNEYS Patented Feb. 29, 1972 3,646,273

10 Sheets-Sheet 2

INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEY Patented Feb. 29, 1972 3,646,273

10 Sheets-Sheet 4

INVENTORS
MARK T. NADIR
CARL N. ABRAMSON
Kenyon & Kenyon Reilly Carr & Chapin
ATTORNEYS INVENTORS
MARK T. NATIR
CARL N. ABRAMSON
BY
Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
Kenyon & Kenyon Reilly Carr & Chapin
ATTORNEY Patented Feb. 29, 1972 3,646,273

10 Sheets-Sheet 8

INVENTORS
MARK T. NADIR
CARL N. ABRAMSON
BY
Kenyon & Kenyon Reilly Carr & Chapin
ATTORNEYS Patented Feb. 29, 1972 3,646,273

10 Sheets-Sheet 9

INVENTORS
MARK T. NADIR
BY CARL N. ABRAMSON
Kenyon & Kenyon Reilly Carr & Chapin
ATTORNEYS INVENTORS
MARK T. NADIR
CARL N. ABRAMSON
BY
Kenyon & Kenyon Reilly Carr & Chapin
ATTORNEYS

MULTIPLEX COMMUNICATION SYSTEM AND METHOD FOR MODIFYING SYSTEM BEHAVIOR

CROSS-REFERENCE TO RELATED APPLICATION

This is a continuation-in-part application of United States Pat. application Ser. No. 861,947, filed on Sept. 29, 1969 by Carl N. Abramson and Mark T. Nadir and entitled, SYSTEMS FOR INFORMATION EXCHANGE.

BACKGROUND OF THE INVENTION

1. Field of the Invention

The present invention relates to electrical communication systems, and more particularly to a system and method for transferring messages and system behavior data from one to another of a plurality of members of the systems.

2. Description of the Prior Art

Information exchange in the present commercial state of the electrical arts involves such well-known instrumentalities as telephone and telegraph systems, radio and television transmitters and receivers, teletypewriters, computers, and data transmitters and receivers of many kinds. Any of these may be linked in various ways to exchange information, for example by wires, cables or electromagnetic (radio or television) waves. The information may be in many "languages," for example: That of the human voice, that of written alphabets and common words, those of many technological or business accounting arts, as engineering or accounting data of all kinds, or the mathematical language of the modern computer.

In the present state of the electrical arts, systems for information exchange employing the foregoing instrumentalities become exceedingly complex because of their basic design concepts. These systems often require the use of highly complex switching systems to set up channels of communication between sending and receiving stations. For example, where telephone lines are set up to interconnect any of the foregoing voice, teletypewriter or computer instrumentalities, complex switching arrangements are required to establish the interconnection and to measure its duration in time for purposes of billing the cost to the customer. Even such sophisticated techniques as time division multiplex (TDM) or frequency division multiplex, and similar techniques designed to increase efficiency by increasing the number of message channels available, do not avoid these disadvantages, and in fact further complicate them. Moreover, some can handle only a limited number of users.

Transmission lines are one basic media used in communication systems. Also, radio and microwave communications are commonly employed. The conventional measure of efficiency of a system is the efficiency with which it utilizes its transmission lines. Efficiency can be determined by considering factors such as the number of messages, bits, words, symbols and commands that can be sent over the lines. Often the number of lines required is overlooked in determining efficiency. A more correct measure of efficiency is perhaps provided by considering the number of symbols (characters, instructions, control signals, etc.) that can be conveyed in a unit time per unit bandwidth. Therefore, the actual measure of system efficiency will be the cost of transmitting the symbols a unit distance. Consequently it is desirable, from an efficiency standpoint, to employ the minimum number of transmission lines between members of a system even as the number of users or the number of symbols transmitted increases. By employing, for instance, one set of transmission lines, then only one set of transmitting and receiving equipment will be required. In addition, the system requirement for circuit switches and/or associated equipment can be greatly reduced or even eliminated. Such higher system efficiency results in a large cost reduction.

A resulting disadvantage of these present commercial systems is attributable to the manner in which time is put to use. If, as with the present telephone system, the system is designed such that the interconnection between originator and receptor stations must be maintained so long as the communicating locations wish to communicate, much time is wasted in setting up the interconnection or when the locations are not actually communicating, as when conversing people pause during a conversation. If this unused wasted time could be made available for use by other stations desiring to communicate, a considerable improvement in economic efficiency could be obtained. This is always important where cost of communication is measured by the time duration of the interconnection between originator and receptor stations. While systems such as TASI (Time Assigned Speech Interpolation) have been devised to make the unused wasted time due to pauses during conversation available for use by others, such systems are expensive and complicated, and permit entry only of relatively large blocks of information.

The foregoing present commercial techniques may be said to reserve or monopolize for use time periods or channels of variable duration during which the originator station sends voice or code modulated waves carrying the information exchanged.

Furthermore, in prior art communications systems, it is ordinarily necessary to extensively redesign the system or switch additional circuit components into such system in order to effect certain behavior changes in the system. Examples of behavior changes in a system are remote maintenance, remote traffic flow, remote connect or disconnect, remote reporting, command transmission or reception, and data modification.

SUMMARY OF THE INVENTION

It is an object of the present invention to provide a system for communicating interactive statements for modifying system behavior between members of the system, which system adapts its behavior as if it were a single entity.

It is another object to provide a system having mechanisms for controlling both the system behavior and the internal data meanings at every portion of the system.

It is another object to provide a system which flexibly accommodates remote maintenance, remote traffic flow, remote connect or disconnect, remote reporting and other controls, without requiring extensive system redesign or extensive additional system components.

It is another object to provide a system which permits any member of the system to issue or receive system behavior statements.

It is another object to provide a system which is adapted to operate under a very large set of varying system conditions.

It is a further object to provide a system which maintains its efficiency while carrying out all of the desired system behavioral processes.

In the above-noted copending Pat. application Ser. No. 861,947 filed on Sept. 29, 1969, there is disclosed generally an electrical communications system and a method of transferring messages from one to another of a plurality of stations in such communications network. More particularly, the stations operate off of a common reference, or synch, generated by common equipment of the system. The synch enables the stations to identify distinct periods (P) as well as the discrete subperiods, hereinafter referred to as SIP, located within a text portion of the periods (P). The SIP identification is accomplished by numbering and counting the SIP to determine the position where it appears in its period (P). The subperiods or SIPS are individually assigned with message meanings (words, letters, numbers, symbols or data of any kind) known to the stations. Information is exchanged by inserting, into selected subperiods, available for use on the transmission medium signals identifying an sending and/or receiving station so that a receiving station may, in response to such signals, derive the message meanings simply by correlating the so-selected subperiods with their assigned message meanings. Thus, the signals identify not only the assigned message meaning by its presence in a particular subperiod or SIP, but also identify the sending and/or receiving station. In general, the message or intelligence is conveyed by employing discrete text subperiods in which an identifying signal (SI) of the sending or receiving station is sent. The receiving station(s) is adapted to detect the SI and, together with counting circuits, determine the exact message meaning conveyed. Thus, the SIP into which the SI is inserted determines the implicit message meaning or contents of the transmission. This meaning may be unique to each pair or group of communication stations. Also in this system, the subscriber uses his equipment on an "as needed" basis, and the lines are utilized by others even when the subscriber is on the line, but not at that moment sending or receiving information.

For purposes of this invention, the term "boxing" is synonymous with the term "system behavior" and is intended to mean one or more of the several meanings set forth below, the meanings of which will become clearer from a reading of the specification and each of the several embodiments detailed herein. It is pointed out that these are not intended as absolute definitions but rather the individual meanings will become apparent from the context and usage of the system behavior mechanism in each embodiment. With this in mind, the term "system behavior" as used in this specification can be defined by any one or more of the following functions performed by the system behavior mechanism:

a. A mechanism for modifying the system behavior such that the implicit message content of the data within the period (P) corresponds to those behavior changes, such as that shown and described with reference to the embodiment of FIG. 7 illustrating the GENERALIZED DEDICATED BOXING OPERATION, the embodiment of FIG. 8 illustrating the equipment used for CHANGING Z-NUMBER, and the embodiment of FIG. 9 illustrating the equipment for generating extended character sets;
b. A system behavior mechanism for reducing the number of entries or the amount of data, measured in bits, required to send a message, such as that shown and described with reference to the embodiment of FIG. 10 illustrating the equipment for employing the PARTIAL SI method;
c. A system behavior mechanism for sending data to specific geophysical areas, such as in accordance with the zoning technique described with reference to the PARTIAL SI method illustrated in FIG. 10;
d. A system behavior mechanism for marking specific information by means of a signal or signals sent in a particular position within a period (P), such as that shown and described with reference to the embodiment of FIG. 11 illustrating a circuit for providing PRIORITY CONTROL, and the embodiment of FIG. 14 illustrating a circuit for providing DELAYED commands;
e. A system behavior mechanism for making the system flexibly responsive to remote controls, such as that shown and described with reference to the embodiment of FIG. 11 illustrating the circuit for providing PRIORITY CONTROL, the embodiment of FIG. 12 illustrating the use of the system behavior mechanism for sending and receiving system MODE OF PERFORMANCE commands, the embodiment of FIG. 13 illustrating the circuit for accomplishing DIAGNOSTIC PROCEDURES, and the embodiment of FIG. 14 illustrating the circuitry for carrying out DELAYED COMMANDS; and
f. A system behavior mechanism whereby any portion of the system is adapted to respond to behavioral statements received on the lines, and also to issue behavioral statement to other members of the system, such as that shown and described with reference to the embodiments of FIGS. 13 and 14.

Boxing can be generally defined for purposes herein as the technique of sending system behavior information, such as instructions, reports and control data, between "members of the system" in a format such that the information can be found within a block of bits reserved for that information.

The term "members of the system" as used herein, is intended to mean the internal system devices which operate the systems, such as the adapters comprising the common and dedicated equipment, the sending and receiving stations including information sending and receiving equipment, the system-modifying equipment, the traffic monitors, the diagnostic units, and any other devices used to make the system operative.

It is to be understood that, as used herein, the term "interactive statement" is intended to mean a statement which either causes one or more members of the system to adopt a specific behavioral pattern or causes that same member to act upon another member of the system, where such other member is the member causing the statement or a different member.

It is also to be understood that, as used herein, the term "-period (P)" is intended to mean some known number of clock counts.

It is also to be understood that, as used herein, the term "-clock counts" is intended to mean events which can be time independent, such as clock pulses or signals. In this connection, it is noted that the system of this invention need not operate off a standard coherent clock producing uniformly time-spaced clock signals, but also could operate off of a noise source which produces clock signals or pulses at random time intervals.

It is also to be understood that, as used herein, the term "synch" circuits is intended to include the counting circuits which allow all members of the system to operate from the same reference point. It includes the clock for producing the clock counts.

It is also to be understood that as used herein, the term "-subperiods" is intended to mean discrete subperiods within a period (P) which do not overlap in time.

It is also to be understood that, as used herein, the term "-text portion" of the period (P) is intended to mean that portion comprising a plurality of consecutive subperiods which are individually assigned with message meanings, for example, alphabetic and numeric characters, words, symbols or data of any kind. The text portion of the period (P) is also used for HANDSHAKING purposes, the details of this operation being disclosed in the above-noted application Ser. No. 861,947.

It is also to be understood that, as used herein, the term "explicit meaning," as applied to the signals inserted within subperiods, is intended to mean the actual, direct coded information expressed by the signals inserted in a subperiod. By contrast, the term "implicit meaning" is intended to signify the message meaning assigned to the individual subperiod in which signals identifying the sending and/or receiving members are inserted.

The boxing signals are usually transmitted within an assigned portion of the period (P) referred to as the Start-Of-Period Identifier (SOPI). The SOPI is usually located near the beginning of each period, but may be placed elsewhere within the period (P), or even may be moved from position to position in each period in some random fashion. The SOPI is arbitrarily self-divided into subsections, including a reference (synch) portion and a system behavior (boxing) portion. The system behavior portion is used to transfer cyclic code boxing information which may, for example, occupy 10 bits depending on the number of cyclic functions provided in the system. The system behavior portion is also used to transfer noncyclic boxing information, the nature of which will be described in more detail hereinafter. It is noted that the actual number of bits constituting the SOPI is largely dependent upon the number of boxing functions provided by each system and the type of logic employed, such as two-level binary or three-level ternary.

Boxing can provide both implicit and explicit directives. For instance the presence of a single boxing signal or set of boxing signals located at a particular position within the system behavior portion of the period (P) are used to modify or alter the meaning of the signals within text portion of the same period (P). Also, the transmission of coded boxing signals can provide an explicit command or additional data in a period (P). It is to be pointed out that while the system behavior signals ordinarily serve to change or modify the implicit or explicit meaning of the signals inserted with the text portion of the same period (P), instances may arise where such system behavior signals in a period (P) are associated with the text signals inserted in a subsequent period (P). For example, when there are no available text subperiods in the period (P) having system behavior signals for a particular member of the system.

The mechanism for providing the cyclic code boxing information generally comprises a code generator which provides a code recurring in a cyclic pattern. As this code is received by members of the system, it will be interpreted into the meaning for which it has been assigned. Generally, some of the cyclic functions provided in the system are:

1. Z-ing
2. Extended character sets
3. Partial SI
4. Priority
5. Zoning

In addition to the cyclic code boxing information transferred in the system behavior portion of the period (P), there is the noncyclic code boxing information which may occupy a number of bits. The noncyclic functions are broken down into both SEQUENCE 2 and DELAYED COMMANDS. The type of data ordinarily transmitted as the SEQUENCE 2 is intended for immediate use. By contrast, the type of data transmitted as DELAYED COMMANDS is in the form of instructions which do not require an immediate response.

One function of the SEQUENCE 2 is to provide replacement bits which occur when one or more bits have been omitted from each text SI in the period having replacement bits. The nature and location of the bits omitted from a SI will be stated by the replacement bit code in the system behavior portion of the period (P). In this manner, all of the SI in the period (P) having replacement bit codes are (a) reduced by a fixed number of bits, (b) all bits omitted from the SI are the same, such as all ones or zeros or combinations thereof: (c) all the bits so omitted had previously occupied the same position within the SI; and (d) the use of a replacement bit in the system behavior portion of a period (P) will automatically indicate the status or identity of the missing bit from the SI. As a result, the number of bits ordinarily required to identify each SI in a SIP is reduced by the factor of the number of replacement bits provided. Consequently, the frequency with which a SI can be transmitted is reduced by a factor related to the number of replacement bits.

Another function of the SEQUENCE 2 is to control the system mode of performance. Here, noncyclic system behavior signals are used to notify the system that:

1. transmission in the period (P) which follows the SOPI is in STANDARD mode,
2. that transmission is in ALTERNATE mode;
3. that the system is in BROADCAST mode;
4. that the system is in METER mode;
5. that the system is in TELEMETRY mode; or
6. in another mode.

Details of the operation of the system under these modes of performance are provided in the portion of the specification relating to FIG. 12.

Another function that the SEQUENCE 2 provides is that of priority. Here, a code is sent in the system behavior portion of the period (P) which notifies the system of the priority level of the message in the text portion of that period (P). Only those messages of the priority level indicated by this code will be permitted entry into this period, thereby providing a marked control over the priority of messages transferred. Consequently, this also provides for an indirect control over the message traffic flow. This control of traffic flow serves to reduce peak loads by prohibiting certain traffic during peak times while at the same time increasing traffic flow during nonpeak times by permitting or even requesting such nonpriority messages.

The SEQUENCE 2 is also used to command a member or part of the system to report its condition or to execute some other diagnostic procedure. Another function to which the SEQUENCE 2 can be employed is to send a Y-number to a common equipment so that, for example, the common equipment will change the assigned SI of one or more of the common equipments in accordance with a Y-number. Still another function of the SEQUENCE 2 is to broadcast a S-number which is used to add, subtract, multiply or otherwise modify the SI of a dedicated equipment.

The DELAYED COMMAND is an instruction to the system commanding the performance of specific actions or responses. The DELAYED COMMAND can be distinguished from an immediate command in that it can be transmitted on a nonimmediate basis. Here, a noncyclic code is sent out in the system behavior portion of the period (P) to identify the existence of a DELAYED COMMAND in the text portion of the same period (P). The DELAYED COMMAND is sent out as a SI in the text portion of the period (P) and has an address directed to general portions or to all of the system, as opposed to any specific users or members.

Thus, it can be seen that the boxing is the system behavior mechanism for operating the system as a single entity while also controlling each small part of the entire system. Boxing also renders the system responsive to remote controls and permits any member of the system to issue or receive commands. Furthermore, boxing can be very selective or very general in its control and permits the system to adapt to a very large set of conditions.

DESCRIPTION OF THE PREFERRED EMBODIMENTS

Figure 1:
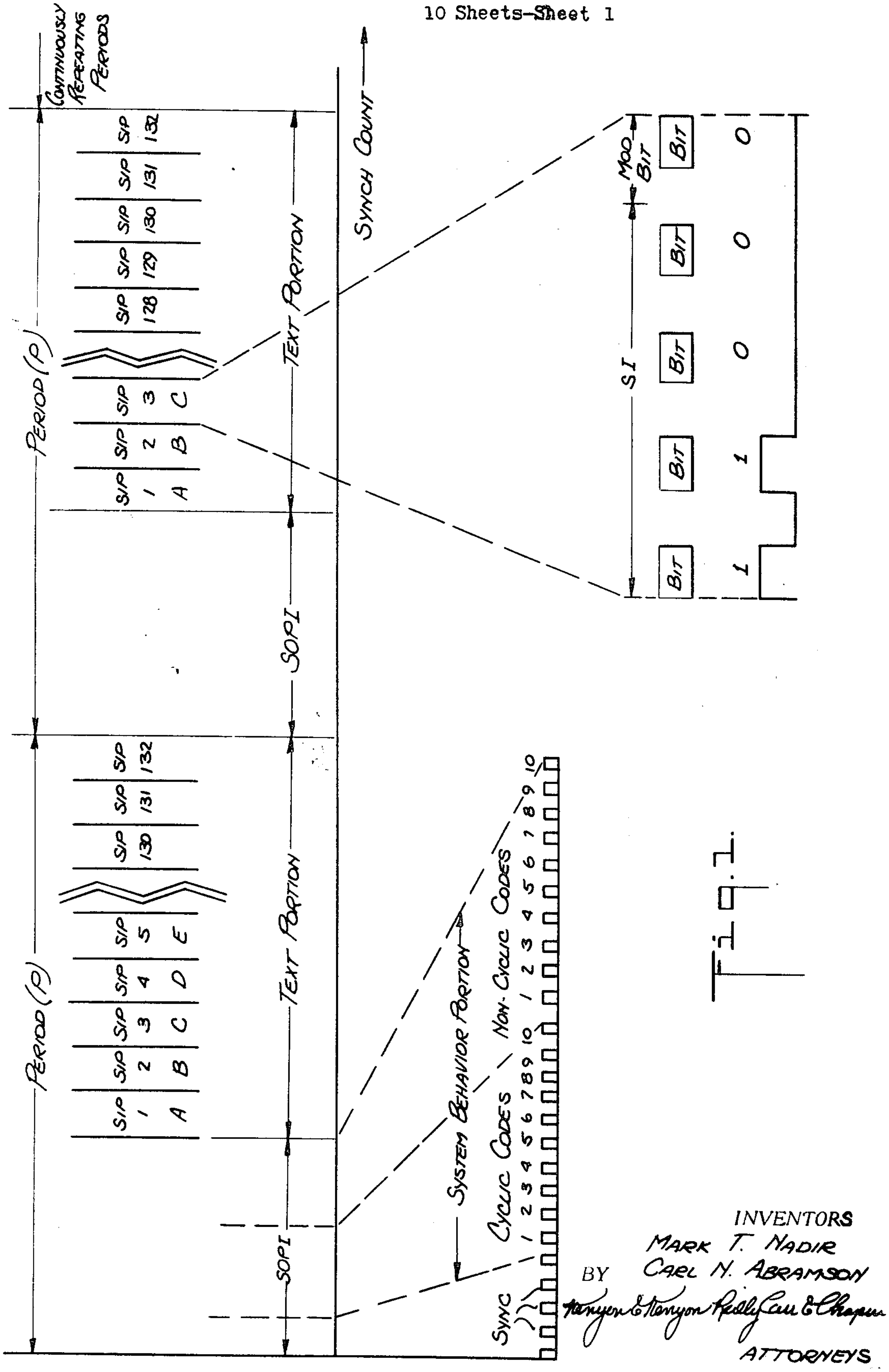
FIG. 1 shows the sequence relationships of the two of a plurality of periods (P), illustrating the arrangement and functions of the subperiods (SIPS)

Referring to FIG. 1, there is shown the sequence relationships essential to an understanding of the concepts of the invention and the apparatus for implementing it. It is to be understood that FIG. 1, as well as the figures to follow, are illustrative of one practical system and many variations may be used depending on system requirements. FIG. 1 illustrates two of a plurality of successive periods (P). The periods (P) are subdivided into a large number, such as 137, of subperiods, or subscriber identification periods (SIPS). Here a SIP is shown as constituted by five bits. As noted previously, each period includes a SOPI section comprising a synch and a system behavior portion, and also includes a text portion comprising 132 SIPS. Special SIPS can be assigned with HANDSHAKING functions and used together with some of the text SIPS being occupied during the HANDSHAKING time by those members engaged in HANDSHAKING. A detailed explanation of the HANDSHAKING operation and apparatus is disclosed in the above-noted patent application Ser. No. 861,947.

Figure 2:
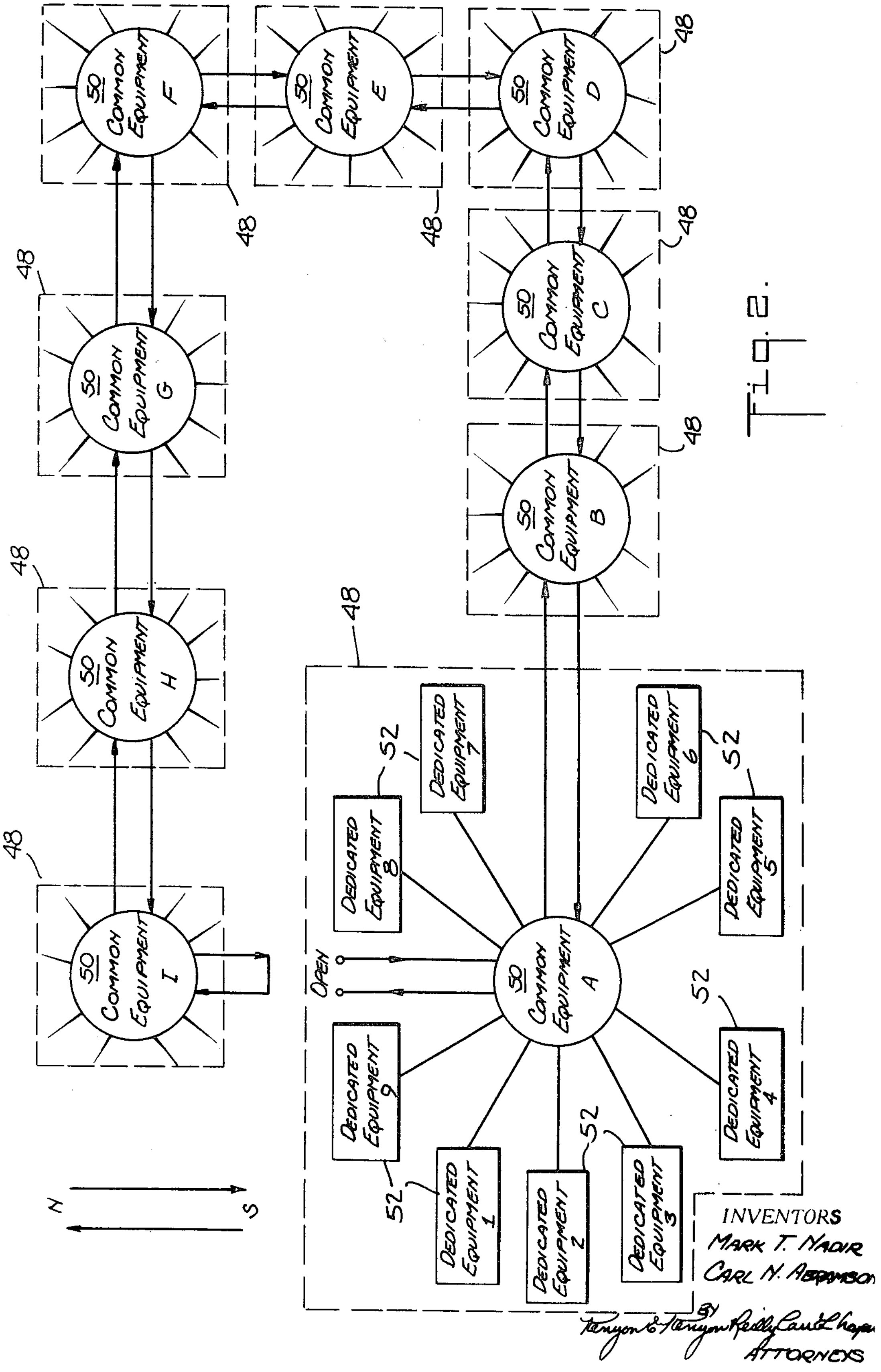
FIG. 2 shows a general block diagram of a system for information exchange having nine adapters connected in a linear network, illustrative of the overall system for the invention shown in FIGS. 3 through 14.

Referring to FIG. 2 there is shown a general block diagram of a system for information exchange which is provided with the boxing machinery of the present invention. The system is constituted by nine adapters 48 connected in a linear network. As indicated by the dotted line enclosure, each adapter 48 comprises one common equipment 50 which, for purposes of describing this invention, services nine subscribers equipped with an individual or dedicated equipment 52. Of course, it is to be understood that any number of adapters 48 and dedicated equipments 52, other than that number shown in FIG. 2, can be connected together to meet the requirements of a given system. Furthermore, the members of the system can be connected in other network configurations than that shown in FIG. 2.

Figure 3:
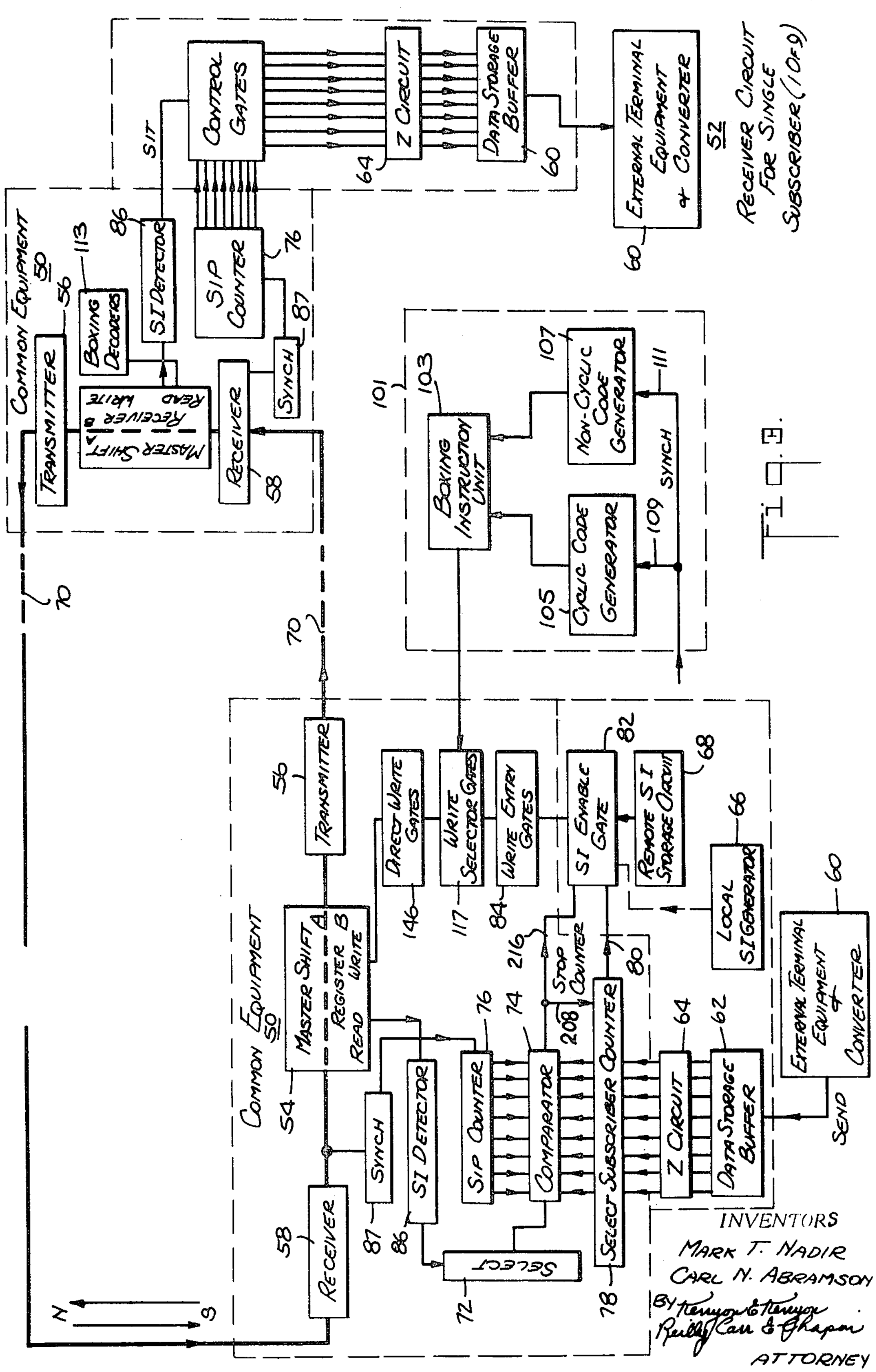
FIG. 3 shows a more detailed circuit diagram of a portion of the system shown in FIG. 2, with the circuit flow paths in the common equipment, the dedicated equipment and the boxing equipment drawn for two subscribers in the send and receive modes or operation, respectively.

As shown by FIG. 3, the dedicated equipment 52 for each subscriber will be connected to an external terminal equipment and converter unit 60, such as a teletype unit. Unit 60 is a part of the external equipment used in conjunction with the system of the present invention for converting data from its standard symbol or word form into a binary character form, and thus does not form a part of the dedicated equipment 52. Generally, the dedicated equipment 52 comprises a data storage buffer 62 for storing the binary characters, and a Z-circuit 64. The data information in the sender's buffer 62 is transformed by the Z-circuit 64 into a character which is correlated to the original character by known variables prior to its entry as a SI into a tagged SIP period. Accordingly, in order that the original character be known at the other end by the receiver, this character arriving at the receiver's circuits must be de-Zeed or restored to the original character. This is accomplished by the receiver's Z-circuit 64 which operates with the original Z-number, previously stored, on the Zeed binary character. Subsequently, the original binary character is restored and inserted in the receiver's storage buffer 62 for use in its external terminal equipment 60. A detailed description of the Z-circuits 64 is provided in the portion of the specification relating to FIG. 8.

The dedicated equipment 52 also comprises a local subscriber identifier, hereinafter called local SI generator 66, which puts out the identifying binary signal of the local subscriber station, and a remote SI storage unit 68 used to store the SI of a remote subscriber station. It is pointed out that each dedicated equipment 52 will have its own designated SI, as well as a Z-number which will be communicated to another subscriber in the system during the HANDSHAKE procedure. The Z-number can be fixed or randomly selected for each dedicated equipment 52. Also, each dedicated equipment 52 will operate from a common time base which is derived by timing circuit and clocks located in the common equipment 50.

The common equipment 50 generally comprises a master shift register 54 for receiving textual data in the form of duobinary labeled SI, and modification bit (mod bit) signals which act to modify the content of information, from any one of its nine subscribers engaged in the send mode and placing it on the transmission line 70, or for receiving the SI's on transmission line 70 and designated for receipt by one of the nine subscribers associated with such master shift register 54. It is noted at this point of the discussion that the master shift register 54 is similarly used to transfer system behavior information between any one of its subscribers and the line, in a manner to be detailed in the section on boxing machinery. Thus, any one of the nine subscribers can read information, which is designated for such subscribers, out of the master shift register 54, or alternatively, any one of these nine subscribers may write information into the master shift register 54 for transmission. The master shift register 54 is connected on each end, respectively, to a ternary-to-duobinary receiver (demodulator) 58 and a duobinary-to-ternary transmitter (modulator) 56. As noted previously, since the system transmits information on the line 70 in a three-state ternary form, then the ternary data must be transformed into or out of a duobinary form. Accordingly, the receiver 58 and transmitter 56 of the common equipment 50 perform these respective functions so that the information may be written into or read out of the master shift register 54 in duobinary form. The transmitter 56 receives duobinary inputs from the master shift register 54 and produces a three-state ternary output on line 70, such as either a DC zero level signal, a sine wave, or a 180° displaced sine wave, depending upon the values of the duobinary inputs. Similarly, the ternary data coming in on the transmission line 70 is detected in the receiver 58 and applied to logic detection gating circuits, not shown, to produce a duobinary output which is subsequently applied to the master shift register 54. For convenience, a duobinary system is operated in conjunction with the ternary line data. It is noted that other than duobinary and ternary forms of data can be used, such as simple binary.

As mentioned above, at certain times the SI of a particular subscriber will be entered into the master shift register 54. However, the particular count at which this entry occurs is critical to the transmission of information since the information content or character text is determined by the particular text SIP into which the SI appears. For instance, if the 15th text SIP is designated to represent the letter "0" in the external terminal equipment and converter 60 of two subscribers, then the appearance of the receiver's SI in the 15th SIP will indicate to the receiving station in its external terminal equipment and converter 60 that the character "0" is being transmitted. With such point in mind it is obvious that the writing of a SI into the master shift register 54 can be made only at the particular SIP count in the period representing the particular character to be transmitted. To accomplish the entry or writing function into the master shift register 54, a select mechanism 72 is employed to select the particular one of nine subscribers to enter data into the register 54 at each available SIP count. Select mechanism 72 includes a comparator circuit 74, a SIP count circuit 76, and a select subscriber counter 78. In this connection, it is to be pointed out that the system shown in FIGS. 2 and 3 could instead be designed with only one, rather than nine, subscribers operating from a shift register. In such case the select subscriber counter 78 portion of the select 72 would not be employed, as well as any other circuitry required only for purposes of operating more than one subscriber from a common equipment.

The comparator circuit 74 compares the binary data submitted by the Z-circuits 64, of any of the nine subscribers wishing to send such data, with the binary characters represented by each SIP that appears in the SIP count circuit 76. When a match occurs, the comparator 74 generates a signal on line 208 which stops the select subscriber counter 78 in the select circuit 72. Select subscriber counter 78 provides an indication as to which of the nine subscribers has this matched character which is ready for entry into the master shift register 54. After the select subscriber counter 78 is stopped it provides a signal on line 80 to a SI enable gate 82 located in that dedicated equipment 52 which has presented the matched character. SI enable gate 82 also receives the comparator match signal on line 216. Actuation of the SI enable gate 82 opens the entry gates 84, write selector gates 117 and direct write gates 146 to the master shift register 54 for only that selected subscriber whereby the SI stored in SI storage unit 68 of the selected subscriber passes through a set of entry gates 84 after which it will be entered into the register 54 in the appropriate character SIP. In this fashion a subscriber sends data by inserting either his own SI or the intended receiver's SI into the SIP corresponding with the message character.

Each SI that is entered into the master shift register 54 will be read out at another point on the transmission line 70 by the receiver subscriber having been assigned that SI and having substantially identical dedicated equipment 52 as the sending subscriber. At the receiver's end, a SI detector 86 in the common equipment 50 associated with the receiver will decode the SI and, together with timing and detection circuits including a synch circuit 87 and the SIP countér 76 which track the incoming information to determine its appropriate SIP position in the period, directs the data to the identified receiver. With this done, the transmitted character may be known.

The boxing equipment 101 for the system includes both common equipment, in that it services all of the dedicated subscribers associated with a common equipment 50, and also includes dedicated equipment, in that there is separate boxing circuitry provided in each dedicated equipment 52.

For purposes of sending system behavior (boxing) information, a boxing instruction unit 103, a cyclic code generator 105, and a noncyclic code generator 107 are employed. Also, synch and count signals derived from the common equipment 50 are provided for the boxing equipment 101 on lines 109 and 111.

For purposes of receiving both cyclic and noncyclic system behavior information, boxing decoders 113 of the boxing equipment 101 are provided.

Before discussing the boxing equipment 101 in greater detail, further understanding of other portions of the system would be helpful at this stage of the discussion.

MASTER SHIFT REGISTER

Figure 4:
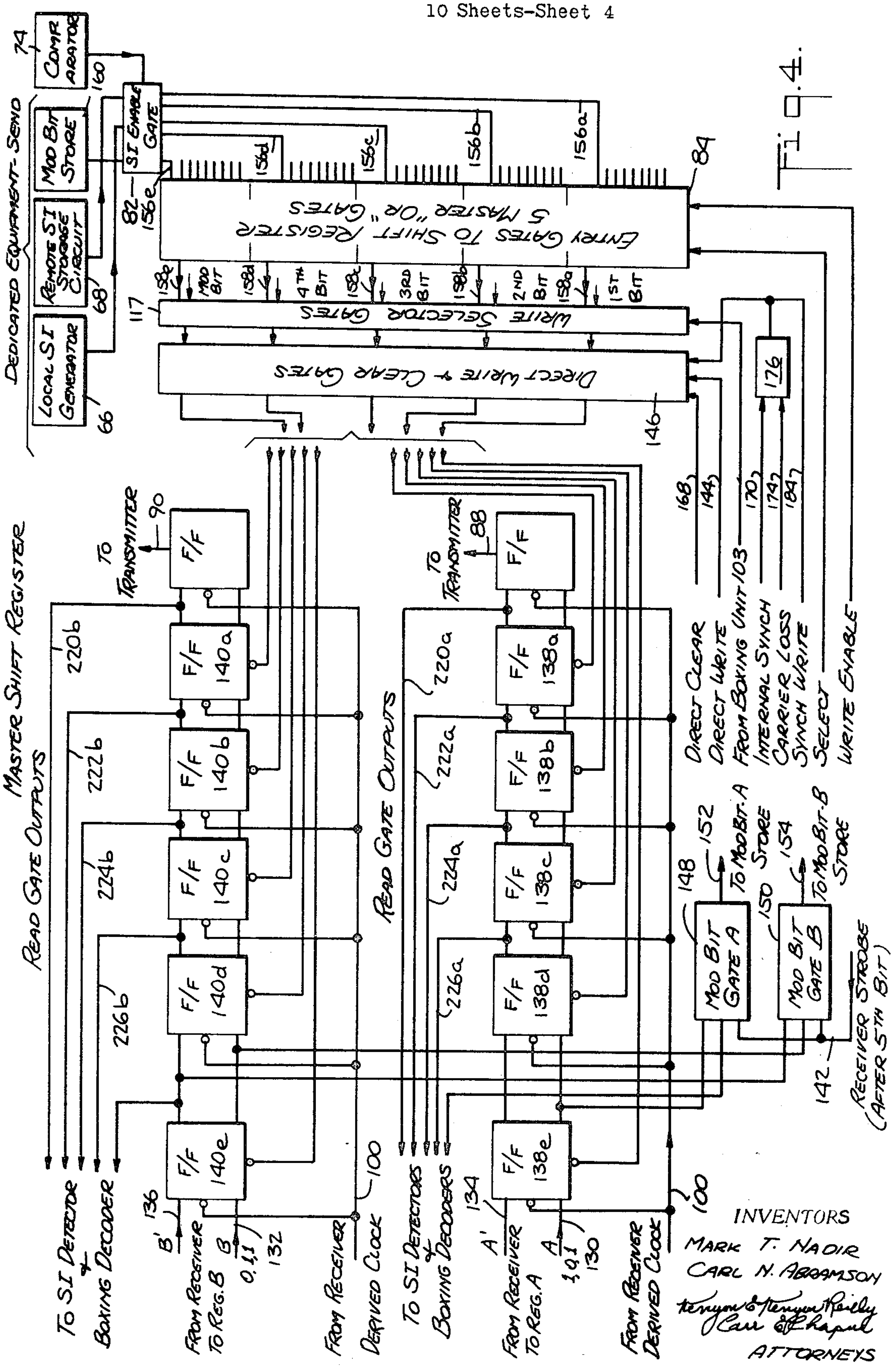
FIG. 4 shows a circuit block diagram of the master shift register of the common equipment, including the gates for writing both text and boxing information into such shift register.

Referring to FIG. 4, the master shift register 54 basically comprises two sets A and B of the flip-flops 138 and 140 designated as parts 138*a–e* and 140*a–e*, respectively. Duobinary information is received serially by these flip-flops 138 and 140 on lines 130, 132, 134 and 136 from the ternary-to-duobinary receiver 58. One-half of the duobinary data enters register part 138 while the other half enters register part 140 at the flip-flops 138*e* and1 40*e*. As noted previously, the first four of the bits in a SIP comprise the SI while the last bit is the modification, hereinafter termed "mod," bit. Connected to each flip-flop 138, 140 is a derived clock signal line 100 coming from the receiver 58. The derived clock signal on line 100 activates the flip-flops 128, 140 so as to shift or advance data information coming from the receiver 58 through the shift register. After five shifts occur and the mod bit occupies the last flip-flops 138*e* and 140*e* in the line, the SIP counter 76 provides a signal to the SI detection circuit 86 indicating that a complete SIP character has been received in the five flip-flops at the same time so that the SI information can now be read out. The SI detection circuit 86 observes the particular SI of the receiving subscriber, and if the SI is for one of the nine subscribers associated with that common equipment, such circuit 86 enables that subscriber to receive the data. The synch 87 and the SIP counter 76 will enable simple determination of which SIP the SI was written in. After the SI is fully entered in the shift register 54 and the SI detector 86 has determined that the information is for one of its users, then such SI detector 86 immediately sends a SI time (SIT) pulse to that intended receiver to indicate that "this data is yours."

During the system behavior portion of the period (P), instead of or in addition to sending and receiving a SI plus a mod bit in the flip-flops 138 and 140, the system behavior information in the form of the cyclic and noncyclic bit codes will be transmitted via write selector gates 117 and direct write gates 146 to the shift register 54, and such information will be received via boxing decoders 113 of the boxing equipment 101. Essentially, the write selector gates 117 select either the cyclic or noncyclic signals, or the SI for inserting into the system behavior portion or the text SIPS as it appears in the shift register 54.

It is to be noted that the derived clock signal 100 provides a continuous shift in the registers 54 since it is connected to each of the register flip-flops 138*e–e* and 140*a–e*. It is also be noted that the actual electronic circuitry in the master shift register 54 and its operation are conventional and within the state of the art and, therefore, are not detailed herein.

If five shifts should occur without any text information coming from the receiver 58, then this can be detected by some predetermined combination of binary states in the register flip-flops 138*a–e* and 140*a–e*. If in a SIP there should be (a) a SI for one of the nine subscribers within a common equipment 50, or (b) no text information appearing as an all "ones" indication to the SI detector 86 that there is an empty SIP, then the system is designed so that one of the nine subscribers in that common equipment 50 will be permitted to enter new data (a SI) either on top of the old data after readout has occurred, or into the empty shift registers 54 where there was an empty SIP. such entry of new data is accomplished by means of a direct write enable signal on line 144 to the direct write and clear gates 146 to the shift register 54.

The procedure for entering data into the shift register 54 is designed to permit maximum use of the SIP subperiods while at the same time avoiding an overwrite or race condition. If, for example, a subscriber has read out information from the shift register 54 but neither such subscriber nor other subscribers operating from the same common equipment 50 has anything to send in that SIP at that time, then signals representing all "ones" will be automatically written into the register 54 to indicate that such registers are empty and available for use by a subscriber in another adapter 48. In this manner, this empty SIP will be available to the subscribers operating from the next common equipment 50 physically located along the transmission line 70, and so on down the line until such SIP is used.

WRITE ENTRY GATES TO SHIFT REGISTER

As shown in FIG. 4, generally nine SI enable gates 82 are provided in each common equipment 50, one gating being connected to each associated subscriber. The inputs to these SI enable gates 82 come from each of the local SI generators 66 and the remote SI storage circuits 68. The SI enable gates 82 are fed to the write entry gates 84, which are essentially five "OR" gates. The SI enable gates 82 provide on four lines 156*a–d* the four bits to identify either the stored SI of the receptor or the originator, and on line 156*e* the modification bit is passed. In some systems it might be desirable to employ a 10- rather than a five-bit SIP so as to send both the sender's SI and the receiver's SI in the same SIP.

Of course, since we are working with a duobinary system, it is to be understood that there are actually four pairs of lines coming from the local SI generator 66 and the remote SI storage circuit 68. All nine lines 156*a* associated with the first bits of each of the nine SI enter a first "OR" gate, all nine lines 156*b* associated with the second bits of all nine SI enter a second "OR" gate, all nine lines 156*c* associated with the third bits of the nine SI enter a third "OR" gate and all nine lines 156*d* associated with the fourth bits of the nine SI enter a fourth "OR" gate. The "OR" gate operates so that the one of nine dedicated equipments 52 to receive a SI enable signal on a line 80 from the select mechanism 72 and comparator circuits 74 will be enabled to pass its SI through the SI enable gate 82 to the write entry gates 84. The output from the entry gates 84 appears on four pairs of lines 158a–d as the four bit SI of one of the nine users. This output enters through the write selector gates 117 to the direct write and clear gates 146. Also, the mod bit which was held by the subscriber in its mod bit store 160 is passed with the four SI bits through the SI enable gate 82.

WRITE SELECTOR GATES

Figure 6:
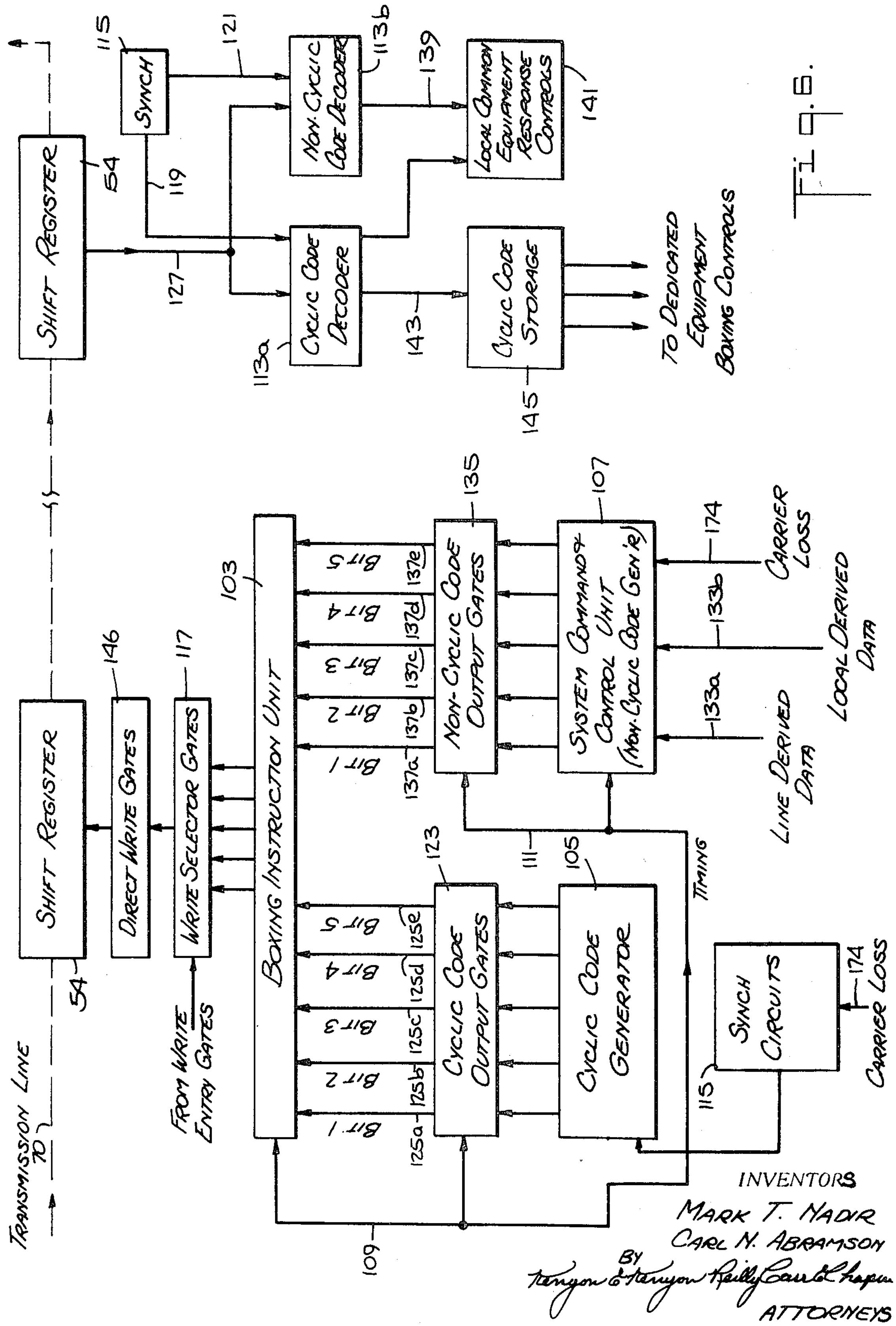
FIG. 6 shows a circuit block diagram of the boxing equipment employed at the sending and receiving points of the system, respectively.

Write selector gates 117, shown in FIGS. 4 and 6, are essentially "OR" gates which generally select, at the proper times, either the coded system behavior signals from the boxing instruction unit 103, or the text signals in the form of timed SI from the write entry gates 84. During the system behavior portion of the period (P), the write selector gates 117 will pass the boxing signals, while during the remainder of the period the text signals will be passed.

DIRECT WRITE AND CLEAR GATES

These gates 146, as shown in FIG. 4, receive the outputs from the write selector gates 117 and under certain conditions will enable such outputs to pass directly into the master shift register 54. In addition to receiving the outputs from the write selector gates 117, the direct write and clear gates 146 are connected to receive a direct write signal on line 144 and a direct clear signal on line 168 from the control logic circuitry within the select mechanism 72, as well as other signals for controlling data which is inserted into the shift register. These latter control signals include system behavior signals which are received from the boxing equipment 101.

If none of the subscribers in a common equipment 50 have data to write into a particular SIP which carried data to one of its associated nine subscribers, then the shift register flip-flops 138a–e and 140a–e are cleared by entering all "ones" so that subscribers in any one of the other eight common equipments 50 are able to write into that SIP. This is accomplished by first detecting the absence of data for a particular SIP, by using the select mechanism 72 to sample the subscribers and produce a direct clear signal 168 when the select mechanism 72 has sampled no requests for that SIP. The direct clear signal is then applied on line 168 to the direct clear gates 146 which write all "ones" into the shift register 54. On the other hand, where a subscriber's SI has been passed through the write entry gates 84 during a particular SIP in the period, a direct write signal 144 will permit this SI to be entered as data into the shift register 54.

Loss of the carrier can be simply detected in the receiver 58 and indicated as a signal on line 174 as shown in FIG. 4. The carrier loss detect line 174 and an internal synch signal line 170 are gated together at 176 so that when the system loses the carrier signal, the first common equipment 50 to detect this will produce a carrier loss detect signal on 174 which enables the internal synch signals of such common equipment 50 to be used for the entire system.

A section of the SOPI has three bits assigned for the synch signal. The synch signal can be detected on these three level bits, respectively, as a "−1," and " and a "+1." Accordingly, where a carrier loss is detected, the first common equipment 50 to detect this condition will provide the carrier signal from its own transmitter 56 for the entire system while at the same time such common equipment will produce a synch signal on line 170 to permit the writing of internally generated synch signals into the direct write gates 146 to the shift register 54. The synch will be written into the SOPI section of each period. In this manner a single common equipment 50 becomes the master clock for the entire system.

Similarly, the particular common equipment 50 which, at a given time, provides the master clock and synch signals for the entire system, also provides the system behavior signals, such as the period sequence count, from its boxing equipment 101 into the direct write gates 146.

SOPI AND SIP COUNTERS

Figure 5:
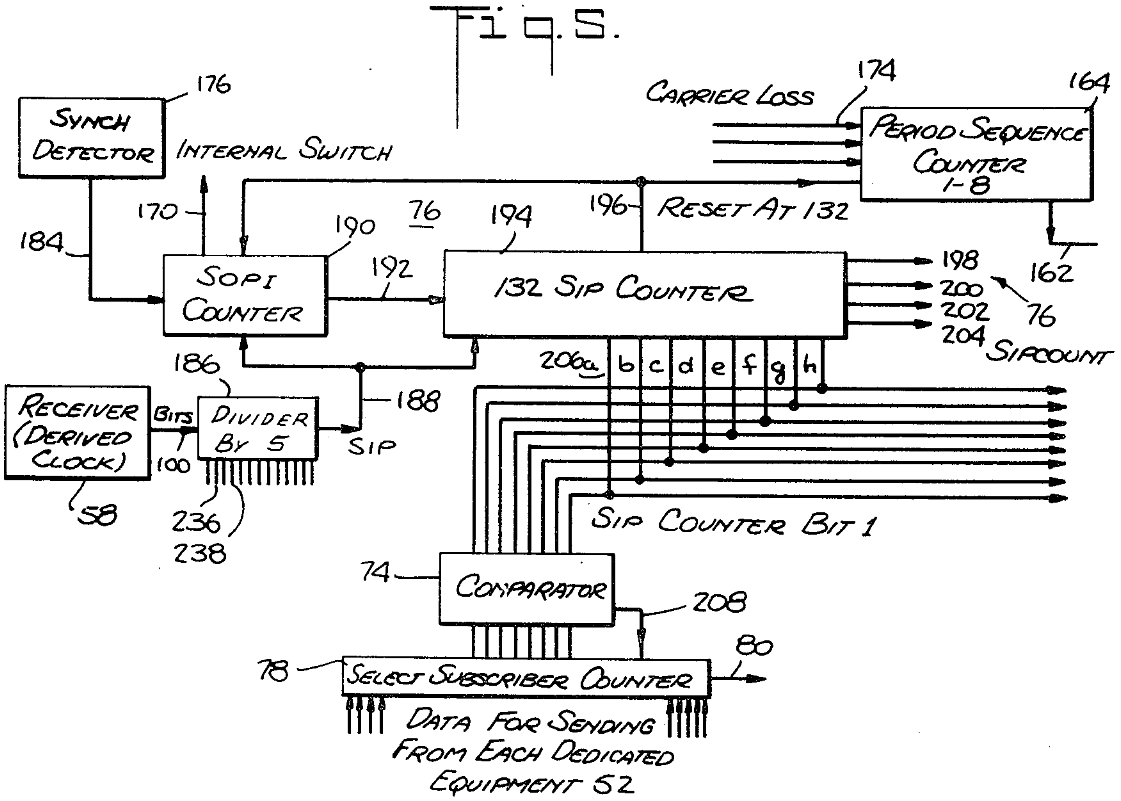
FIG. 5 shows a circuit block diagram of the synch and counter circuitry of the common equipment, including the SOPI and SIP counters, the period sequence counter and the select subscriber counter.

As shown in FIG. 5, these counters, generally referred to previously as SIP counters 76, consist of counter circuitry driven by the derived master clock on line 100 coming from receiver 58. The SIP counter 76 includes a five-bit SIP count portion 186 adapted to produce output signals at chosen intervals in the five-bit SIP count including a SIP pulse upon the passage of every five clock pulses. In turn, the SIP pulse is applied on line 188 to a SOPI counter 190 which is used to mark off the SOPI counts immediately preceding the text SIPS. In this system the SOPI, as illustrated in FIG. 1, provides an indication as to the start of each period (P) as well as defining the location of the cyclic and noncyclic system behavior information. After the SOPI counter 190 counts to the end of the SOPI count, it provides an enable signal on line 192 to a 132-count SIP counter 194, which signal is held for the duration of time in which the 132 SIP counts occur. After completion of the SIP count to 132, the period (P) is complete and the SOPI counter 190 again counts out the SOPI count, after which the 132 count repeats in SIP counter 194. After a SIP count of 132, a reset pulse is provided on line 196 to the 132 SIP counter 194 which again waits for the SOPI counts before beginning a new count. Thus, it is not until after the SOPI is counted that we being counting the 132 SIPS, thereby assuring that we will be at the correct starting point when the first SIP count for the next period begins.

The 132 SIP counter 194 comprises an eight-stage counter which is designed to be reset after a count of 132. The counter is advanced by one at every SIP count by the five-bit SIP counter 186 so that the SIP count comes up at the beginning of each new SIP. The first 128 SIPS are designed as text SIPS The last four counts are designated, in order, as (129) special SIP, (130) service request, (131) My SI IS, and (132) control SIP. Special control lines 198, 200, 202 and 204, respectively, extend out of the counter 194 for individually indicating the presence of these last four SIP counts. Accordingly, when the counter is at 129 a special SIP signal can be supplied, at the count of 131 a MY SI IS signal can be supplied, and at the count of 132 a control SIP signal can be supplied. Also, it is noted that the text SIPS 1 through 128 can be employed to convey the MY SI IS identification. Each of the eight stages also provides a SIP count binary output on eight lines 206a–h which is used throughout the system to provide SIP timing for inserting data at appropriate counts into the master shift registers 54 and for determining the particular SIP in which incoming data was located.

One modification of the SIP counter 76 may include a divider circuit, now shown, which divides or multiplies the 128 count by two, by four or otherwise so that the counter will readily be adapted for use with a 32, 64, or other character size input/output machine. This feature of the SIP counter 76 is discussed in detail in connection with the section of boxing devoted to extended character sets.

The select mechanism 72, shown in FIGS. 3 and 5, consists essentially of the comparator 74, the SIP count circuit 76, and the select subscriber counter 78. Counter 78 sequentially looks at the character bits from each of the nine dedicated units 52 that is in the send mode. Eight master comparator "OR" gates are provided for each of the eight bits defining a single character. Since 128 text SIPS are provided, then each of the 128 text characters can be correlated with each of the 128 SIP counts. The comparator 78 generates a signal on line 208 which stops the select subscriber counter 78 when one of the nine subscribers has this matched character. When stopped, the select counter 78 signals the SI enable gate 82 in the selected dedicated equipment 52 via one of lines 80. Where a SIP is received by a common equipment 50 for one of its subscribers and there is no data to be entered in the SIP at that time by any of such subscribers, then the control logic circuit in the select unit 72 will provide the direct clear signal on line 168, as shown in FIG. 4. This signal on line 168 is applied to the direct clear gates 146 to clear the shift register 54 and thereby permit entry by another common equipment 50 into the particular SIP.

Thus, the comparator 74 determines a first condition which is that there is a SIP to send for that particular SIP count. The SI detection circuit 86 determines a second condition which is that the SIP is empty or potentially empty. This is accomplished by examining the SI in the shift register 54 to initially determine whether the incoming information should be directed to one of the nine subscribers associated with that particular adapter 48 and, secondly, to determine which of these nine subscribers should receive such information. After the above two conditions are met a signal is sent to the selected subscriber to permit it to send. At the same time, this particular subscriber must, of course, be in the send mode of operation and must be signalling that he desires to transmit this particular information in his buffer.

GENERAL BOXING EQUIPMENT

Referring to FIG. 6, there is shown a more detailed block diagram of the boxing equipment 101.

The synch circuits for this system are indicated by the numeral 115. Synch circuits 115 include the SOPI and SIP counter circuits discussed previously. The lines 109, 111, 119 and 121 supply the count signals for use by various parts of the boxing equipment 101. The cyclic code generator 105 comprises counter circuitry in synchronism with the synch circuits 115 and connected to produce predetermined coded outputs. The counter circuitry of the cyclic code generator 105 is advanced by the count signals from synch circuits 115. Selected output lines of the generator 105 are connected to a plurality of output gates 123 to produce output signals from such gates 123 corresponding with each of the cyclic codes. The various cyclic codes may, for example, be used for extended character sets, Z-numbers, partial SI, priority control and zoning. Additional or fewer cyclic code gates may be provided in accordance with the number of cyclic codes employed in the system. Each of cyclic code output gates 123 is connected to receive a predetermined count from the generator 105. For example, the output gate for code 1 may provide a given bit output on line 125*a* when the generator 105 is at a period (P) count of 4, 8, 12, 16, etc., while the output gate for code 2 may produce an output on line 125*b* at the period (P) counts of 4, 7, 10, 13, etc. The output lines 125*a–e* are connected to the boxing instruction unit 103. Boxing instruction unit 103 is essentially the timing and control mechanism for controlling the input boxing data which is fed to the write selector gates 117.

As discussed previously, the system behavior portion of the period (P) includes a cyclic function for transmitting cyclic code data of the type placed on lines 125*a–e*. Cyclic code 1 is written as a zero, plus one, or minus one into a designated bit for code 1. Thus, for example, during the periods 4, 8, 12, 16, etc., the cyclic code 1 might have a "plus one" bit written as the cyclic code 1 in the system behavior portion of the period (P). A typical system might employ 10 bit positions in the system behavior portion for indicating cyclic functions, thereby permitting as many as 10 or more cyclic codes in a period (P). In summary, the cyclic code generator 105 is simply a counter counting to a number which is of sufficient magnitude to display all of the codes for the cyclic functions.

When a dedicated equipment 52 is receiving data, boxing information appearing in the system behavior portion of the period (P) is read from the master shift register 54 and directed via lines 127 to either a cyclic code decoder 113*a* or a noncyclic decoder 113*b*. This data can be read out of the master shift register 54 in either destructive or nondestructive fashion. Such data is steered to its respective decoder by means of the synch circuitry 115 which simply opens gates to the cyclic code decoder 113*a* during the cyclic code counts of the SOPI, and similarly opens the gates to the noncyclic code decoder 113*b* during the noncyclic counts of the SOPI. It is noted that, in this system, one SIP at a time is either written into or read out of the master shift register 54. Where each SIP is composed of five bits, then actually five lines, indicated in FIG. 6 as 127, are used for directing system behavior signals out of the shift register 54 and into the decoders 113*a* or 113*b*.

Generally, one common equipment 50 provides the synch and the system behavior signals for the entire system, which system may be composed of several common equipments 50. Accordingly, every dedicated equipment 52 in the entire system is commanded by that master common equipment which is in control. While each common equipment 50 is provided with its own synch and boxing circuitry, such circuitry is only employed by the one common equipment which is in control of the entire system. The technique used for placing a common equipment 50 in control of the entire system is known herein as CARRIER LOSS, wherein a carrier loss signal is produced at the first common equipment 52 located downstream of the site where the carrier signal is lost on the transmission line 70. Upon generation of a carrier loss signal, this common equipment 52 will be summoned or enabled to seize command of the synch and boxing operation for the entire system. As shown in FIG. 6, the carrier loss line 174 is connected to the local synch circuits 115 for activating the cyclic code generator 105. When a carrier loss signal is present on line 174, generator 105 will be employed as the cyclic code counter for the entire system. Without a carrier loss signal on line 174 the generator 105 will not generate its own cyclic codes but rather will operate off of the cyclic code signals detected on the transmission line 70.

Therefore cyclic codes are placed on the transmission line 70 at given positions in the system behavior portion of the period, read from the transmission line 70 via the master shift register 54, stored and then decoded in boxing decoder 113*a*. Generally, the cyclic codes are changed in binary state every one or more periods (P).

Referring again to FIG. 6, the system command and control unit 107 operates in much the same manner as the cyclic code generator 105 but, by contrast, does not include a counter as a source for its codes. Rather, its code source is either the noncyclic information received from upline or from external command control units and system monitors which are receiving system performance and parameter data. Basically, as shown in FIG. 6, the system command and control unit 107 is an encoder which takes system behavior signals from the lines 133*a* and *b* and generates the noncyclic codes corresponding thereto. The data on line 133*a* is information which is received from the transmission line 70 in the form of textual information. The data on line 133*b* is local external information, such as a command or system monitor data. The output lines of unit 107 are connected to noncyclic code output gates 135 which sends out this code data, at the proper times, in the code form used by the system via lines 137*a–e*. Both the cyclic and the noncyclic code data are presented to the boxing instruction unit 103 which operates from common synch and count signals to pass either the cyclic or the noncyclic code signals so that it is inserted on the line in the appropriate portions of each period (P). This boxing data is placed in the shift register 54 via write selector gates 117 and direct write gates 146.

The system behavior data is directed to one or more, or even all parts of the system where it is required to produce the system performance desired. For instance, where traffic flow is monitored, the system command and control unit 107 will produce correction command data in response to the traffic flow signals entering on lines 133, which correction control signals will be placed in the noncyclic code output gates 135 which holds such signals as they are used. These correction control signals will be of such nature as to regulate the traffic downstream on the line for specific portions of the system, or the entire system.

It is noted that the actual instructions for correcting traffic flow need not be explicitly set forth in the system behavior portion of the period. Rather, the system behavior portion is used to transmit the coded signals which serve to indicate the existence of traffic correction signals in the text portion of the same period (P) while the text SIPS provide the specific instruction. Those members of the system to which the traffic instruction is directed will receive the instructions by detecting their own SI or some other prearranged SI, in the text portion and/or system behavior portion of the period. Next, such members will correlate the subperiod count number of the received signal with its assigned meaning to determine the actual traffic correction instruction.

Generally, noncyclic code data is employed to control the response of common equipment 50, whereas cyclic code data is used to control the response of dedicated equipment 52. Furthermore, it can be said that the common equipment controls the dedicated equipment. Accordingly, the data received in the noncyclic code decoder 113*b* is sent, in its decoded, useful form, via line 139 to the local common equipment response controls 141. Also, the data received in the cyclic code decoder is sent via line 143 to a cyclic code storage unit 145 which holds the data on a periodic basis as it is used by various boxing controls in the dedicated equipment 52.

GENERALIZED DEDICATED boxing OPERATION

Figure 7:
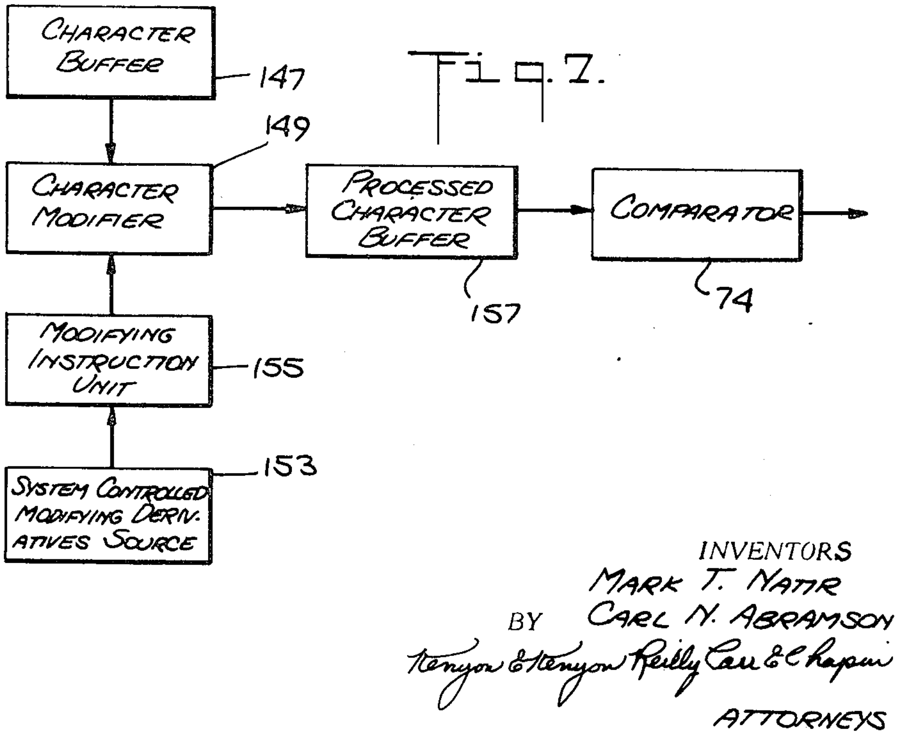
FIG. 7 is a functional block diagram of the generalized boxing mechanism in the dedicated equipment used to modify a character.

Referring to FIG. 7, there is shown a block diagram illustrating the generalized boxing operation in the dedicated equipment 52. The dedicated equipment 52 sends and receives data in the form of a character to be processed. This character is generally transmitted by sending the SI of the sending and/or receiving subscriber in that particular SIP having a message meaning corresponding with the character to be processed.

As mentioned previously, the boxing operation can, if desired, change the implied value of the message sent by operating on the character with the Z-circuit 64 and then sending a SI, in the SIP having a message meaning corresponding with this modified character, along the transmission line to its destination where it is converted back into its original or explicit message meaning for use by the receiver. The manner of modifying or changing the implicit meaning (character) of the signals inserted in the text SIPS is generally determined by the boxing signals in the system behavior portion of the same period (P). Such boxing signals are detected and used at both the receiver's and the sender's end for modifying the original character and then for restoring such received modified character to its original form.

In addition, the boxing function in the dedicated equipment 52 can be used to extend the number or length of a character set by extending the working count of the period (P) for a dedicated equipment, such as from 128 characters per period to 256 characters in a period. In this case, the characters to be processed must be modified by the boxing equipment so as to correspond with 256 rather than 128 SIP meanings per working period. It is noted that while some subscribers are using a 128-character set and other subscribers use a 256-character set, the synch remains common to all subscribers in the system, as will become apparent upon reading the portion of this specification devoted to extended character sets.

The original character to be processed is applied from a buffer 147 into a character modifier 149 which operates on the original character in a predetermined manner. Character modifier 149 consists of several gates operating as a permutation matrix to change the code representing the character in buffer 147. The manner of modifying the original character is determined by the instructions received from a system-controlled modifying derivatives source 153. The source 153 includes the boxing decoders 113 for detecting the system behavior signals on the transmission line, which signals act as modifiers on the original characters in the buffer 147. Source 153 may also include internal system decoders for receiving information originating from nonboxing units and/or from external sources. The modifying commands derived in the source 153 are applied to a modifying instruction unit 155 which produces the modifying signals corresponding to such commands, such as signals for adding, subtracting, multiplying or dividing. The character modifier 149 applies the modifying signals from unit 155 to the original character stored in the buffer 147 and, in turn, produces a modified character for a processed character buffer 157. This processed character is now made available to the sending circuits of the system via comparator 74. In the receive mode the boxing operation for the dedicated equipment 52, comprising the derivatives source 153 and the modifying instruction unit 155, in the receive mode is essentially the reverse of the sending operation. That is, the data received off the transmission line is the modified character which must be demodified back into its original character form. This is done simply by operating on the modified character to the same degree as it was originally operated on to restore the character to its original form.

CHANGING Z-NUMBER

Figure 8:
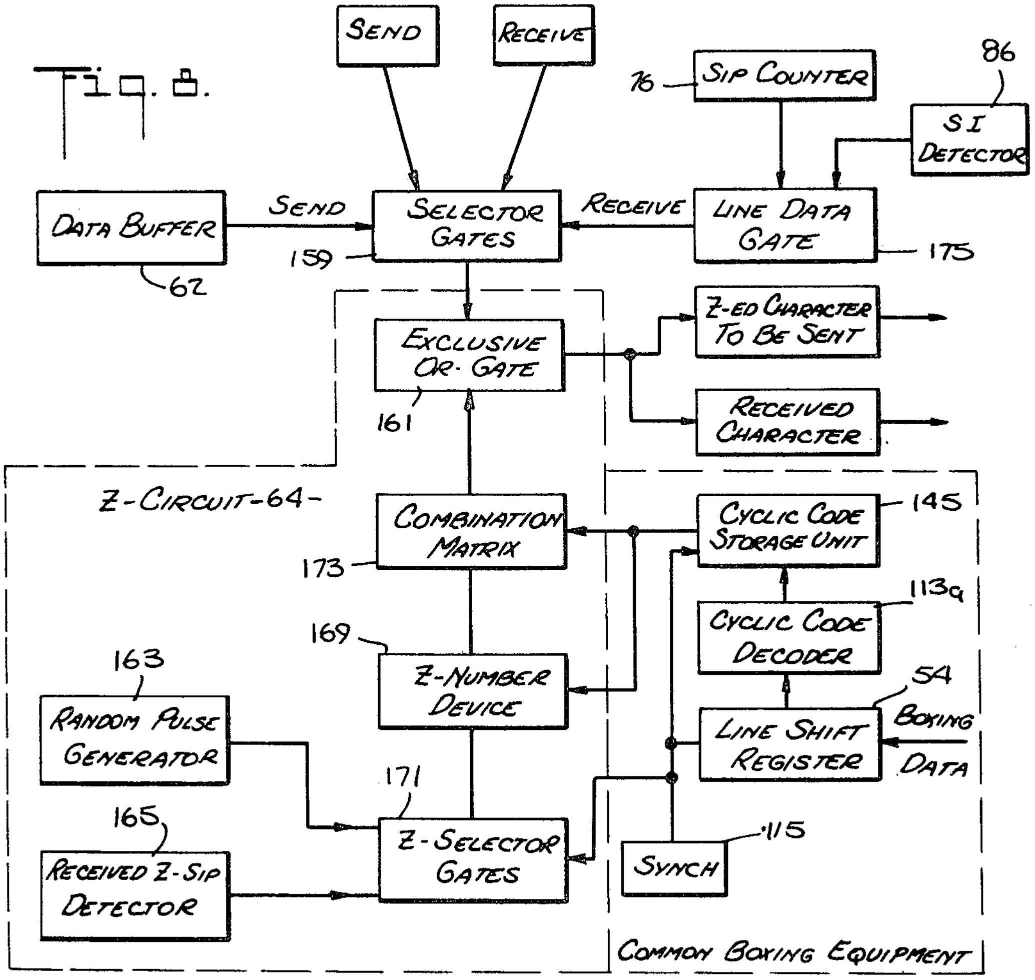
FIG. 8 is a block diagram of the Z-circuit including the boxing equipment for shifting the Z-number.

Referring to FIG. 8, there is shown a block diagram of the circuitry used for altering the bit positions of the stored Z-number. The cyclic boxing information can be used to shift the Z-number in some cyclic fashion thereby making the actual Z-number a direct function of the boxing information. This shifting scheme is particularly useful in preventing intruders from easily gathering data from the system.

The Z-number can be controlled by a book code. The book code is a prearranged random code which changes upon command from the line shift register 54 via the cyclic code decoder 113*a* and the cyclic code storage unit 145, shown in FIGS. 6 and 8. The book code source might be the data stored on magnetic tape, punched tape, punched card, disc file, or any other storage device. Through the use of the Z-number and the cyclic function which commands the use of the book code, then encryption results which is very difficult for an intruder to decode.

More specifically, a character to be sent by a dedicated equipment 52 is stored in a data buffer 62. Selector gates 159 admit this original character to a bit-by-bit exclusive "OR" gate 161 which combines this character data with the output from the Z-circuit 64. In an exclusive "OR" gate, a "0" plus a "1" provide a "1" output, and an "0" plus a "0" or a "1" plus a "1" provide a "0" output. Therefore, when the binary character from buffer 62 is added to a second binary number, in this case the Z-number from Z-circuit 64, in the exclusive "OR" gate 161, a certain sum will result. If this sum (Zeed number) is again added to the same Z-number using a similar exclusive "OR" gate, then the resulting sum will be identical to the original number, (de-Zeed). For instance, where a number, such as the number 5 and represented in binary form as 101 is added to a Z-number equal to 3, represented in binary form as 011, then the resultant binary number will equal 110, having dropped any carry bits. This Zeed number might have the sixth SIP assigned to it when it is sent by the sender's dedicated equipment 52. At the reciever's end, when the Zeed number 110 has the same Z-number 011 added to it, the resultant character (de-Zeed number) will equal a binary number of 101 which is identical to the original binary number or character of 5 which was sent by the sender. This is the manner in which the exclusive "OR" gates 161 are employed to provide a Zeed character for transmission to the receiver and to then restore or de-Z this received character back to the original character for use by the receiver's external terminal equipment 60.

The Z-circuit 64, indicated in dotted line in FIG. 8, comprises two sources of Z-numbers, being a random pulse generator 163 or a nonrandom Z–SIP detector 165. Both of the Z-sources 163 and 165 act in conjunction with the SIP count, from within the count circuits of synch 115, to present the Z-number via the Z-selector gates 171 to a Z-number device 169. Thus, the Z-selector gates 171 are controlled by the system synch circuits 115. The Z-number device 169 is a source for the book codes which operates on the initial Z-number. Also, the Z-number device 169 is a storage register for the initial Z-number received from selector gates 171.

Consequently, the book code modified Z-number is applied by device 169 to a combination matrix 173, upon command by the cyclic data from the cyclic code storage unit 145. Combination matrix 173 acts upon this input in such manner that the resulting Z-number is related to the initial Z-number but in a manner determined by the cyclic code signals detected from the system behavior portion of the period (P).

The modified Z-number produced by the combination matrix 173 is applied by the exclusive "OR" gate 161 to either a character to be sent from data buffer 62, or to incoming data from a line data gate 175. When a dedicated equipment 52 is in the send mode of operation, the selector gates 159 select the character to be sent from the data buffer 62. Similarly, when a dedicated equipment 52 is in the receive mode of operation, the selector gates 159 select the data coming in off the line which is stored in line data gate 175. It is noted that the line data gate 175 simply provides the SIP count of the SI received on the transmission line, since this SIP count corresponds with a particular data character.

In this fashion, the Z-circuit 64 will either operate on an original character from the data buffer 62 to produce a Zeed character for sending on the line, or such Z-circuit 64 will similarly operate on an incoming Zeed character received off the line in the line data gate 175 to restore it to the original character.

Thus, the cyclic code in the system behavior portion of the period (P) operates to change or shift Z-ing patterns employed in the system. Furthermore, if desired, a noncyclic delayed command signal can be inserted into the system behavior portion of a period (P) to indicate the existence of a change or shift in the Z-number, while the actual amount of such shift is specifically indicated by inserting a SI into a particular SIP.

EXTENDED CHARACTER SETS

Figure 9:
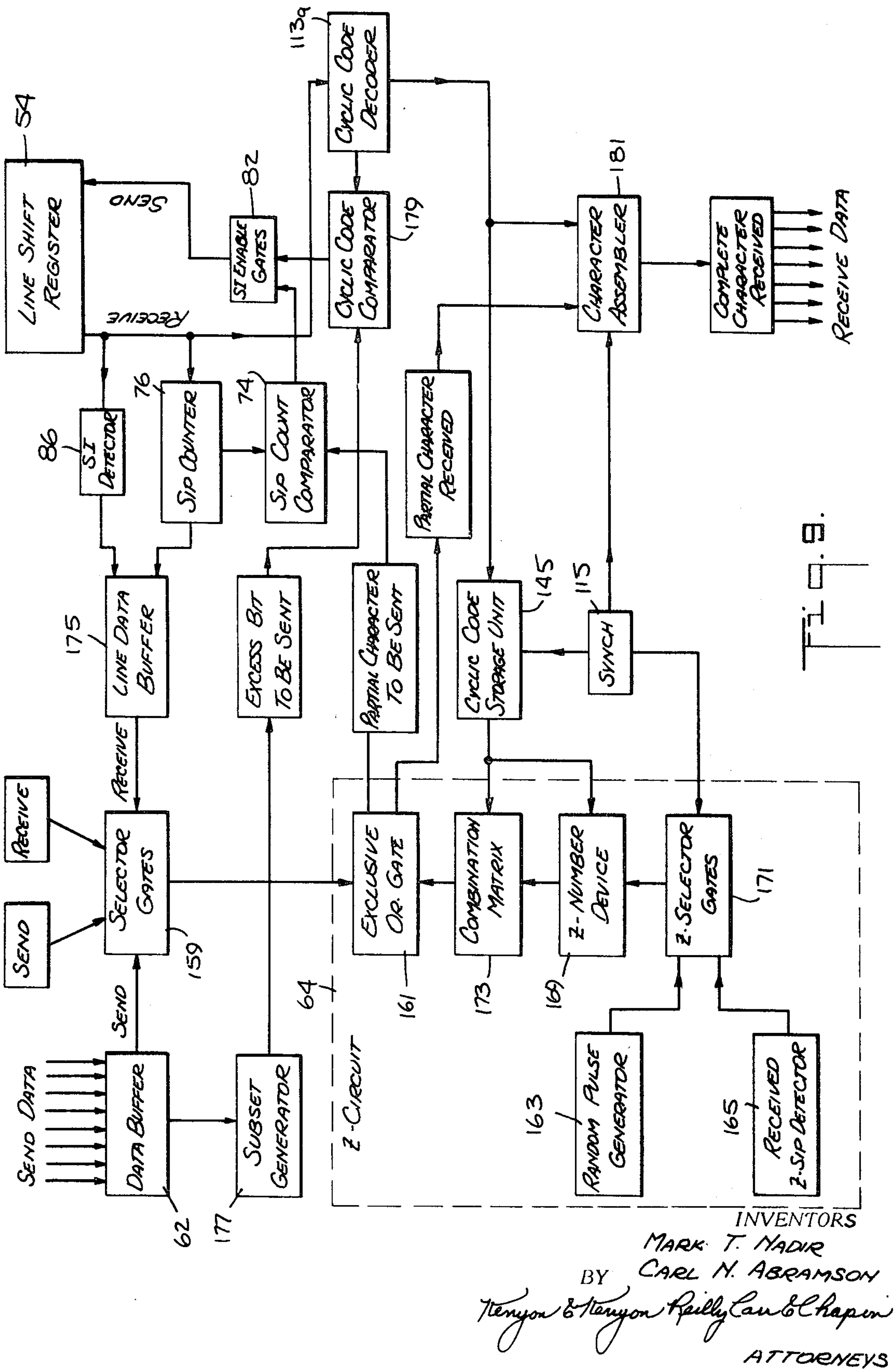
FIG. 9 is a block diagram of the circuitry for implementing extended character sets.

Referring to FIG. 9, the cyclic portion of the boxing equipment is used to generate extended character sets. In conventional data transmission sets the actual character is transmitted in some form, usually binary. Consequently, use of five-bit binary characters limits the size of the set to 32 characters and, similarly, use of six-bit binary characters limits the size of the set to 64 characters.

The system according to the present invention possesses the inherent capability of using only the SIPS necessary for transmission of data. Therefore the size of the character set is not limited by the number of binary bits comprising a character. This factor permits the use of extended character sets that vary in size by very large degrees, such as between one and 10,000 characters per set.

The extended character set can be employed to combine two or more symbols, and sending a word or group of symbols at one time in one or a few SIPS, in the same manner by which characters are individually sent in a SIP. Furthermore, the extended character set makes it possible to send selected sets of words, if desired. By combining symbols or characters, a SIP is transmitted less frequently and the information content, per SIP, increases. For example, if two SIPS corresponding to the characters T and O are combined into a single SIP corresponding to the word TO, then the latter SIP is transmitted only half as frequently as the total former SIPS. This, in effect, reduces the transmission load by 50 percent.

The cyclic portion of the boxing equipment is used to generate extended character sets. This generally is accomplished by combining a cyclic code, in the form of a period sequence number in the system behavior portion of the period (P), with the SIP count comprising the partial character. The number provided by the cyclic code acts as a multiplier on the SIP count, thereby producing extended character sets. Thus, in order to assemble a complete character, both the SIP count and the cyclic code associated with the extended character set must be detected from the incoming line and then combined to form the complete character. Similarly, when sending a character in an extended set, the character is broken up into a partial character, which is compared in a SIP count comparator, and a cyclic code (excess bits) which is compared in a cyclic code comparator. When both of these comparators have been matched with the corresponding available SIP count and cyclic code on the line, the SI will be entered in the appropriate SIP. The presence of the SI in this particular SIP in the period marked with the cyclic code for the required character set thereby identifies the complete character.

The cost of transmitting data, using a large character set, can be substantially less than the cost of transmitting data with a small character set. Of course, the exact cost will be determined by the particular character set arrangement and the type of data transmitted.

In FIG. 9 there is shown a block diagram of the circuitry used to provide extended character sets. It is noted that those portions of the circuit which are substantially identical to those circuits shown in FIG. 8 or the preceding figures will be indicated by the identical reference numerals. A character to be sent from data buffer 62 is broken down into a partial character which is directed to selector gates 159, and an excess bit(s) which is directed to a subset generator 177. Subset generator 177 produces a code corresponding to the excess bit(s), which code is assigned to the system behavior portion of the period (P) so as to expand the character set. The excess bit(s) can be either a cyclic or a noncyclic code. Thus, the full message meaning is not transmitted as a character represented by the SIP occupied by a SI, but rather is transmitted by implication by the particular period (P) in which this SI appears. For instance, the cyclic code in the system behavior portion of a period (P) attaches a certain meaning to data within that period (P).

The partial character to be sent is operated on in the Z-circuit 64, in a manner previously described, and applied to the SIP count comparator 74. The excess bit produced by subset generator 177 is applied to a cyclic code comparator 179. The cyclic code comparator 179 compares the excess bit(s) of the character to be transmitted with the cyclic codes detected on the line passing through the line shift register 54. For this purpose, the cyclic code decoder 113*a* is connected to the cyclic code comparator 179. In a similar manner, the SIP count comparator 74 compares the partial character to be sent with the SIP count stored in the line data buffer 175. When both the SIP count comparator 74 and the cyclic code comparator 179 detect a match, then the SI enable gate 82 will operate to permit entry of the sender's or receiver's SI into the appropriate SIP in the line shift register 54.

Data is received from the line shift register 54 in a manner generally similar to that described previously. Specifically, the partial character is detected as a SI in a particular SIP and placed in the line data buffer 175. At this point, the partial character is in its Zeed form and therefore must be restored to its original character in the Z-circuit 64. After the partial character is operated on in the Z-circuit 64, it is directed from the exclusive OR-gate 161 to a character assembler 181. Character assembler 181 receives both the partial character, in the form of a SIP count, and also the excess bit(s), in the form of a cyclic code, and reconstructs them into a complete character. The original character is now available for use by the subscriber.

From the above it can be seen that one binary bit can be used in the SOPI to double a character set. For instance, where the characters to be sent are to be represented by an eight-bit binary, and seven bits can represent the number of characters equal to X, then two times X characters can be represented by one excess binary bit in the SOPI to expand the set to the equivalent of an eight-bit set over the length of two periods. In the same manner, where a system employs ternary logic, then three times X characters can be represented.

To illustrate the operation of an extended character set, assume that a 128 text SIP period is used in a system in which some subscribers require a 256-character set. An alternating bit comprising 0,1,0,1,0,1, etc., is used in the cyclic portion of the SOPI. The "0" bit represents the characters from 0–128 and the "1" bit represents the 129–256 characters. If it is desired to send a character which ordinarily would occupy the 135th SIP, this can be represented as 128 plus 7, equivalent to a binary SIP count of 10000111. The first seven bits provide the SIP count while the last bit comprises the excess bit corresponding to the cyclic count. As discussed previously, the SIP count and the excess bit are compared in their respective comparators with the SIP count and the cyclic code on the line. When a match occurs, a SI is sent out in the appropriate SIP of the cyclic period having an excess bit of "1."

It is noted that some stations need not use the extended character sets and would still be permitted to transfer data in the same periods, but without employing the cyclic code for the extended character set. Similarly, some stations may use multiple subperiods within a given period, such as a 32-character set.

Another character compression technique which can be employed by the circuitry shown in FIG. 9 involves the use of system behavior signals to indicate the presence of preselected characters. The most commonly occurring characters transmitted between members of a system may, for example, comprise the letters T, E, R, S, O, and A. These characters can be individually represented by a code signal in the system behavior portion of the periods (P), which signals indicate that one of these characters precedes or postcedes the message meaning or character sent in the subperiods of the same period (P). Furthermore, the above-mentioned six characters can be indicated by six sequence numbers appearing in cyclic fashion in the system behavior portion. Referring to FIG. 9, the subset generator 177 produces the excess bit or sequence number representing the character for sending in the system behavior portion. This excess bit is compared with the line received cyclic codes by the cyclic code comparator 179. When a match occurs in both the SIP count comparator 74 and the cyclic code comparator 179, then the complete message comprising the partial text character and the excess bit character will be sent. It is noted that, actually, the identification signal is inserted in the text subperiod representing the partial text character, which in turn is located in a period having a cyclic code identifying the excess bit present in the subset generator 177. For example, where it is desired to send the characters R H in a system having a code sequence number of 3 representing the character R then the identification signal of a sending and/or receiving member is simply inserted in the subperiod having the character H assigned thereto [and also having the code sequence number of 3 inserted in the system behavior portion of the same period (P)]. Thus, since the code sequence numbers indicate the specific characters which precede the characters in the subperiods, then the complete message meaning received by a member(s) comprises both characters R H. In addition to employing the system behavior signals for communicating letters of the alphabet, numerals can also be represented. Such numerals can be used to postcede or precede other text characters or to operate directly on such text characters, as by multiplication, addition, etc.

PARTIAL SI

The partial SI method is adapted by the cyclic portion of the SOPI for increasing the number of addresses or SI in a system, without increasing the number of bits in each SIP. According to this method, only a portion (partial SI) of the full SI appears as a SI in the text SIPS of a period (P). The other portion of the full SI exists as a cyclic code in the SOPI. Therefore, the complete SI is the partial SI presented as a cyclic code in the system behavior portion of a period (P) plus the partial SI located in a text SIP of the same period (P).

For example, a SI represented as 00101 associated with a period having a cyclic code of 001 will not be addressed to the same site as a SI of 00101 located in a SIP of a period (P) having a cyclic code of 010, since the cyclic codes are not the same in both cases. Therefore each site will have assigned to it a SI consisting of both a cyclic code and a partial text SI. From the above it can be readily seen that the cyclic code acts as a multiplier to permit the assignment of very large numbers of SI. Also, this cyclic code in the system behavior portion of the period (P) is sampled and held on a periodic basis since it defines a portion of the SI for all the SI in a given period (P).

Figure 10:
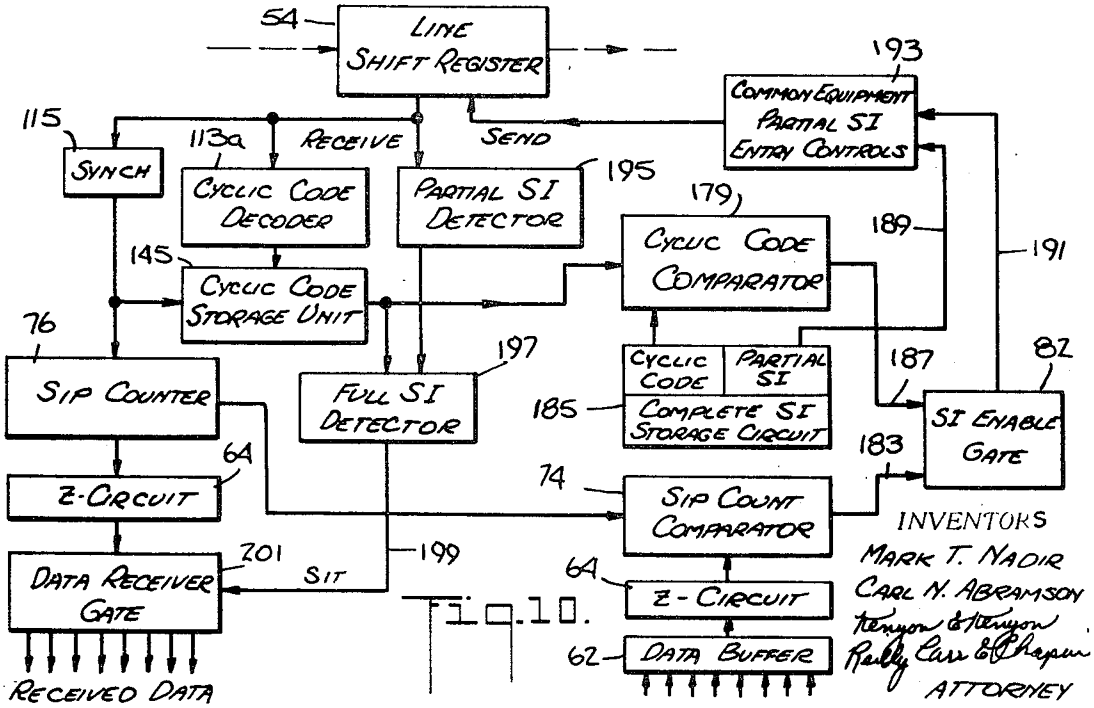
FIG. 10 is a block diagram of the circuitry for implementing the partial SI method.

Referring to FIG. 10 there is shown a block diagram of a circuit using the partial SI method. Data for sending is applied to the SIP count comparator circuit 74 via the data buffer 62 and Z-circuit 64. This data is compared with the SIP count off the line shift register 54. When a match occurs, the SIP count comparator 74 provides on line 183, the first of two conditions which must occur before a SI can be entered into a SIP in the shift register 54. The second of these two conditions is that the cyclic code of the period in the shift register 54 corresponds with the cyclic code assigned to the station having data to send. For such purposes, a cyclic code comparator 179 receives the incoming cyclic codes via cyclic code decoder 113*a* and cyclic code storage unit 145, and compares such codes with the cyclic code stored in the SI storage circuit 185. Upon the occurrence of a match in both comparators 74 and 179, the SI enable gate 82 will be enabled by means of the incoming signals on lines 183 and 187. This produces a signal on the output line 191 of gate 82 which in turn permits the partial SI in storage circuit 185 to be passed via line 189 through the partial SI write entry controls 193. Write entry controls 193 generally comprise the various gating circuits associated with the writing function for the line shift register 54.

Data received off the line is detected by both a partial SI detector 195 and the cyclic code decoder 113*a* to produce a complete SI detection signal in a full SI detector 197. When this occurs, a SIT signal is sent on line 199 to a receiver gate 201. Receiver gate 201 stores the de-Zeed SIP count of SIP counter 76 upon the arrival of the SIT signal for subsequent use by the station. It is noted, therefore, that a character, in the form of a SIP count, is not received and stored by a station unless both that station's partial SI and corresponding cyclic code have been detected, since the complete SI is constituted by both of these portions.

Another system behavior function which can be performed by this system is that of zoning. This is accomplished in a manner similar to the partial SI, except that the boxing signal in the system behavior portion of a period (P) is used to determine the specific area of group of members of the system to which textual data in that period (P) will be delivered. For example, where a zoning code X is assigned to a group of members of the system designated as members of zone X and, similarly a zoning code Y is assigned to members of zone Y, then textual data in a period (P) having a zoning code X in its system behavior portion will be extracted only by those members X. Likewise, the members Y will only extract textual data from those periods (P) having a zoning code Y in its system behavior portion. When sending data, all members of the system wishing to transmit to a member of zone X will enter textual data into those periods (P) marked by the zoning bit X in its system behavior portion The assignment of zoning codes can be fixed in some cyclical pattern, made traffic flow sensitive or made dependent on noncyclic boxing data.

In this fashion, the assignment of a zoning function to the system behavior portion can serve to give a period (P) a broad destination. The system, in carrying out the system behavior directives will deliver that period (P) to the indicated area. Consequently, the nature of the assignment of zoning functions throughout the system will control the traffic flow in each area.

PRIORITY CONTROL

An area of a system can become inaccessible to some subscribers for a number of reasons. For instance, all of the subscribers may be calling out of the area, too many calls may be arriving into the area, or maintenance, repairs or priority requirements may exist. Also, when traffic flow becomes heavy, some high-priority or "hot" subscribers may demand service on an immediate basis, and to accommodate these subscribers, certain periods will be marked with high-priority codes in the SOPI. Low-priority users can leave their machines loaded during peak traffic and, when traffic eases, low-priority zoning can be initiated to accept the data from the low-priority users.

Either the cyclic or the noncyclic functions can be used for priority control. As previously discussed in the section on the use of the SEQUENCE 2 for priority, a cyclic or a noncyclic code notifies the system of the priority level of the messages in a given period. Consequently, only messages of this priority level can be entered into this period. This, in turn, produces an indirect control over message traffic flow.

Figure 11:
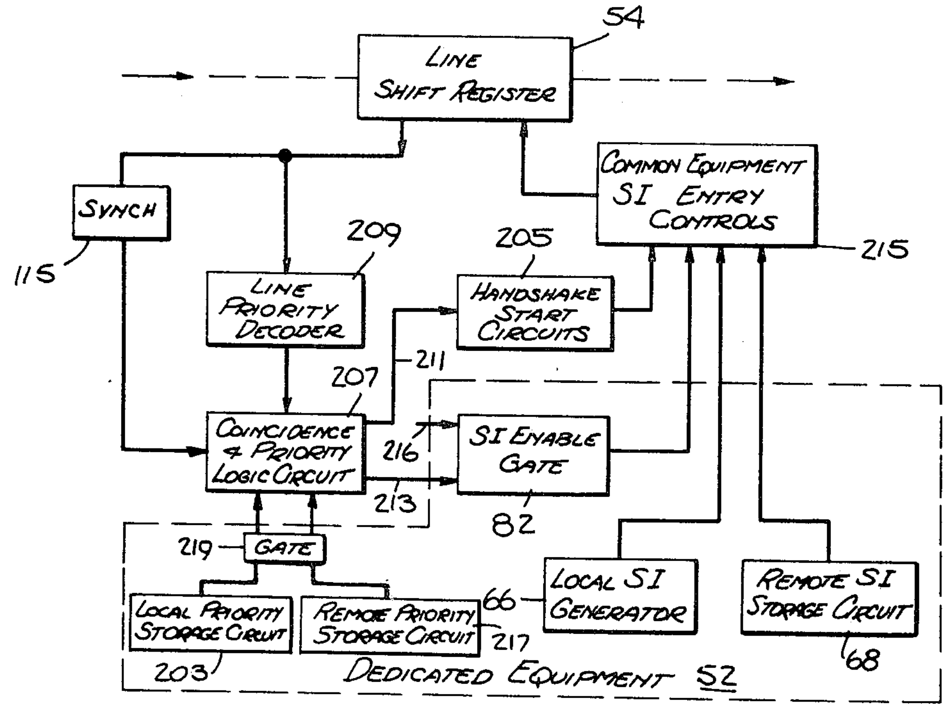
FIG. 11 is a block diagram of the circuitry for providing priority control.

A circuit for providing priority control is shown in FIG. 11. Here, each dedicated equipment 52 has assigned to it a local priority code which is stored with that subscriber's SI in his local priority storage circuit 203. A subscriber may, for example have assigned to it a priority level of 1 through 9 in which the number 1 represents the lowest priority and the number 9 the highest priority in the system. Also, the subscriber has a remote priority storage circuit 217 which stores the priority level of the originator subscriber during the HANDSHAKING procedure. The local priority code stored in circuit 203 is used when the local subscriber is the originator. Similarly, the remote priority code in storage circuit 217 is used when the remote subscriber is the originator. A gate 219 applies the appropriate priority to the coincidence and priority logic circuit 207.

The line priority code can be produced from either the cyclic code generator 105 or the system command and control unit (noncyclic code generator) 107 shown and described in reference to FIG. 6. Depending upon the nature of the priority required, either noncyclic or cyclic code priority signals will be inserted in the system behavior portion of the periods (P).

Before a subscriber is permitted to begin HANDSHAKING or to send non-HANDSHAKING signals, a comparison circuit must signify that the priority conditions have been met. This is accomplished in a coincidence and priority logic circuit 207 which compares either the local or remote priority stored in circuits 203 or 217, respectively, with the priority requirements of the line 70 at a given time. Thus, the line priority conditions must be detected from the system behavior portion of the period assigned to priorities.

For purposes of HANDSHAKING, all members of the system have available to them a range of selectable priority levels to represent their importance in HANDSHAKING. This priority level is compared with the system priority level, which is variable due to changes in traffic flow. If the member's priority is higher than the line priority, the coincidence and priority logic circuit 207 provides an enable signal on line 211 to HANDSHAKE START CIRCUITS 205, and HANDSHAKE is permitted to proceed. The result is that, during times of heavy use, HANDSHAKING may be prevented until traffic on the line tapers off. It is to be noted that all users of all priorities will eventually complete HANDSHAKING.

For purposes of sending non-HANDSHAKING signals, the originator's priority, stored in circuit 203 or 217, is constantly checked against the boxing codes in the system behavior portion. When the originator's priority is equal to or greater than the line boxing priority, entry is allowed, providing that SIP count equals the Zeed character to be sent. In this fashion, the available periods (P) are reduced, thereby reducing the speed by which the machine may send data over the system.

A line priority decoder 209 is provided for detecting the local priority on the line 70. Priority decoder 209 is essentially the same as the cyclic and noncyclic code decoders 113*a* and 113*b* discussed previously. The line priority detected by the decoder 209 is applied to the coincidence and priority logic circuit 207 which compares such signals with those stored in the circuit 203 or 217 of a dedicated equipment 52. When sending non-HANDSHAKING SIGNALS, where the originator's priority is equal to or higher than the priority required on the line, then the coincidence and priority logic circuit 207 will provide an enabling signal on line 213 to the SI enable gate 82. Of course, the enabling signal on line 213 is effective only when the line shift register 54 is ready to receive the proper character being transmitted by the dedicated equipment 52. That is, when the SIP count in the line shift register 54 has been matched by the comparator 74 with the character for sending by a dedicated equipment 52, the operation of which produces a comparator output signal on line 216 leading into SI enable gate 82. It is noted that the comparator 74, shown in FIG. 3, can be either incorporated into the coincidence and priority logic circuit 207, or designed as a separate portion thereof.

Upon receipt of the enabling signal on line 213, the SI enable gate 82 applies a signal to the common equipment SI entry controls 215. In addition, either or both the local SI and the remote SI stored in circuits 66 and 68 are sent to the SI entry controls 215. SI entry controls 215 consist essentially of the previously discussed write entry gates 84, the write selector gates 117 and the direct write and clear gates 146 leading into the line shift register 54. In this fashion, the priority control circuits permit signals to be sent on the line.

In the circuit shown in FIG. 11, priority control can by dynamic in the sense that it is controlled by a remote device, not shown. This remote device, operating via the noncyclic code generator 107, shown in FIGS. 3 and 6, directs the priority codes to subscribers in each area of the system. Of course, the cyclic codes can also be used for priority control. In this case, the cyclic codes representing priority levels are designed into the common equipment so that subscribers having a given priority level will be permitted entry into selected periods (P) having the same or a lower level priority requirement. In this system, the highest priority level subscriber can enter all periods (P). This cyclic priority control can be considered a static system in the sense that it is internally, rather than remotely, controlled.

Also, the circuit shown in FIG. 11 can include one or more line monitors for sampling the amount of data on the line and, in turn, allotting cyclic code priorities to the nearby subscribers on the basis of measured traffic flow.

From the above, it can readily be seen that normal communications are carried on within the text portion of periods (P) while the system behavior directives, in this case the priority control, are carried out in the same periods (P).

MODE OF PERFORMANCE

As mentioned previously, some of the modes of performance under which the system operates are, the STANDARD MODE, the ALTERNATE MODE, the BROADCAST MODE, the METER MODE, the TELEMETRY MODE, or other modes.

When the system is in STANDARD MODE we have the following conditions prevailing:

a. the sender transmits using the receiver's SI.

b. the receiver transmits using the sender's SI.

When the system is in ALTERNATE MODE, we have the following conditions:

a. the sender transmits using his own SI.

b. the receiver transmits using his own SI.

When the system is in the BROADCAST MODE, the sender sends data intended to be received by a number of subscribers. He can send either his own or another's SI for this purpose.

When the system is in the METER MODE any meters in the system report their data if they are ready. Computers or recorders listen at this time for these reports. The meter's own SI would preferably be used to make these reports.

When the system is in the TELEMETRY MODE both the sender and the receiver transmit using the receiver's SI.

Figure 12:
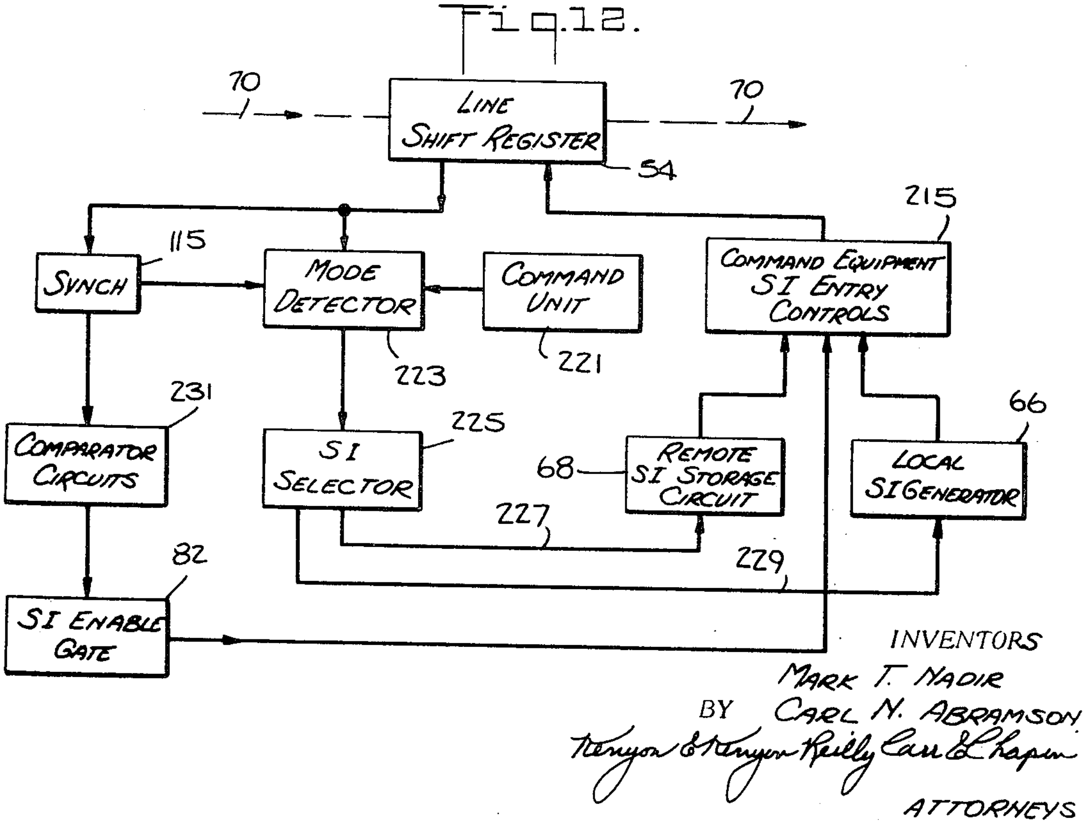
FIG. 12 is a block diagram of the circuitry illustrating the operation of the system in response to commands for two different modes of performance.

The use of the boxing function for sending and receiving system mode of performance commands is shown in FIG. 12. Here, the system is designed to operate in either the STANDARD or in the ALTERNATE MODE. Of course, it is to be understood that other modes of performance can also be implemented by the system. The particular mode of performance desired by two or more subscribers can be selected by a mode of performance command unit 221. As in most cases, where a particular subscriber is not in the commanding position for directing the system mode of performance, then such subscriber will simply detect the mode of performance as a noncyclic code appearing the system behavior portion of the period (P). The mode of performance is detected by a mode detector 223 which receives the mode of performance data from the line shift register 54. Synch signals from the local synch circuits 115 enable the mode detector 223 to receive the proper system behavior data. The mode of performance code received from the line 70 serves as an instruction for the mode detector 223 to operate in a particular mode. In the case of the subscriber in command of the system mode of performance, such subscriber selects between operating in the STANDARD MODE wherein the sender sends the receiver's SI and the receiver in turn transmits the sender's SI, or in the alternate mode wherein both the sender and the receiver send their own SI, respectively. This is accomplished via a SI selector 225 which is connected to receive the output signals from the mode detector 223. SI selector 225 simply sends out an enabling signal on line 227 when the STANDARD MODE of operation is detected by the mode detector 223, and alternately sends an enabling signal on line 229 when the ALTERNATE MODE of operation is commanded. Lines 227 and 229 are connected to the remote SI storage circuit 68 and the local SI generator 66, respectively. Where the STANDARD MODE is used, the SI stored in the remote SI storage circuit 68 will be sent on the line via the common equipment SI entry controls 215. In the ALTERNATE MODE of performance, the SI stored in the local SI generator 66 will be received by the SI entry controls 215 for sending on the line.

It is noted that the SI entry controls 215 also receive an enable signal from the SI enable gate 82. SI enable gate 82 is operated only after all the conditions required for sending have been met. These conditions occur when the character SIP count comparator 74 has detected a match and the cyclic and noncyclic code boxing bits have been detected by their respective comparator circuits, as for example in the coincidence and priority logic circuit 207 shown in FIG. 11. These above-noted comparator circuits are generally indicated in the FIG. 12 by the numeral 231.

It is to be pointed out that while the system shown in FIG. 12 is specifically described with respect to two operating modes, several other modes of performance can similarly be employed. Thus, the boxing equipment provides an adaptive system in that the text adapts to the system behavior as well as the system adapting to the text. Stated another way, the response of the system mechanisms to the textual data is modified or changed by the system behavior data.

DIAGNOSTIC PROCEDURE

Figure 13:
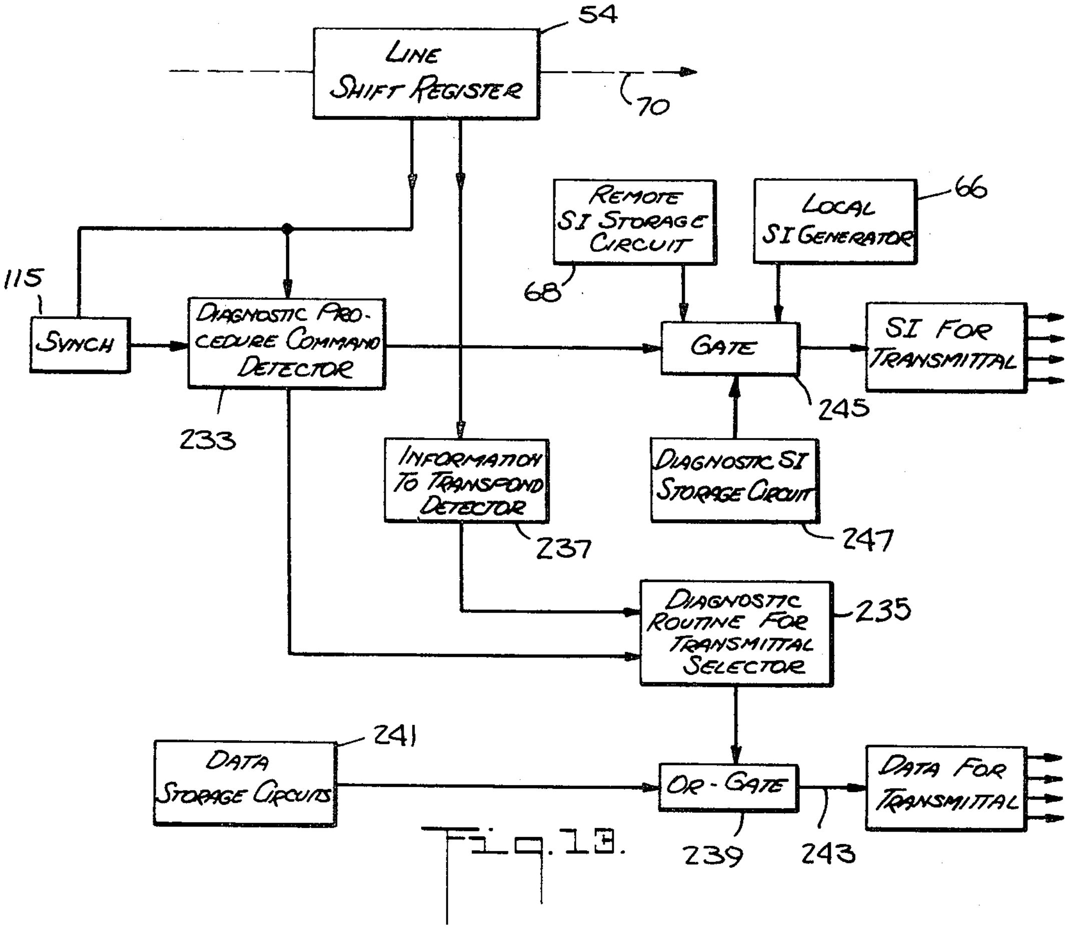
FIG. 13 is a block diagram of the circuitry for receiving and/or sending diagnostic procedures.

Referring to FIG. 13, there is shown a system for accomplishing some diagnostic routines such as CLEAR THE LINE, SHUT DOWN, TRANSMIT KNOWN SEQUENCE, and TRANSPOND KNOWN SEQUENCE. Generally, two types of diagnostic routines are used, these being known as STORED routines in which a machine goes through a routine which is stored in the local circuitry and SEND routines wherein a machine receives information to transpond on the line and goes through this received routine in a step-by-step manner of instruction. A DIAGNOSTIC PROCEDURE COMMAND DETECTOR 233 is provided for receiving diagnostic information in noncyclic code form in the system behavior portion of the period (P), and in turn indicating to the system the nature of the diagnostic procedure, that is, whether the procedure is a stored or a received diagnostic procedure.

A DIAGNOSTIC ROUTINE FOR TRANSMITTAL SELECTOR 235 organizes the routine to be transmitted, regardless of whether such routine is a stored or a received routine. Selector 235 also includes a stored routine within the circuitry, for sending the same in situations where the routine employed is to be a stored routine.

A RECEIVED INFORMATION TO TRANSPOND DETECTOR 237 is provided for receiving textual information from the line which contains a diagnostic routine sent from another area of the system. Ordinarily the detector 233 receives system behavior signals indicating the presence, and in some cases the nature, of a diagnostic procedure, whereas the detector 237 receives the specific diagnostic routine from the text portion of the same period (P) carrying such system behavior signals. Both the RECEIVED INFORMATION TO TRANSPOND DETECTOR 237 and the DIAGNOSTIC PROCEDURE COMMAND DETECTOR 233 have their outputs connected to the DIAGNOSTIC ROUTINE FOR TRANSMITTAL SELECTOR 235. An OR-gate 239 is connected to select either the diagnostic routine for transmittal from selector circuit 235 or the text to be sent from data storage circuits 241. Gates 239 then direct the data for transmission on line 243.

Both the remote SI storage circuit 68 and the local SI generator 66 are connected to a gate 245 which selects one of these SI or a special diagnostic SI stored in DIAGNOSTIC SI STORAGE circuit 247. The stored or wired SI in circuits 66 and 68 are ordinarily sent in the text portion of the period. However, the stored diagnostic SI in circuit 247 is sent out when a diagnostic command is sensed in the system behavior portion of a period (P) by the detector 233. This stored diagnostic SI is eventually transmitted to a system diagnostic monitor not shown, which makes analytical or diagnostic decisions as to the diagnostic data, i.e., it simply processes it. The results of such processing may then provide feedback of information from the diagnostic monitor so as to produce the necessary changes back at the dedicated and/or command equipment. Such changes might be CLEAR UP THIS CONDITION, or TURN OFF A SPECIFIC FAULTY DETECTED EQUIPMENT. In this manner, the diagnostic circuitry causes the system to adapt its behavior to various routines.

DELAYED COMMANDS

Figure 14:
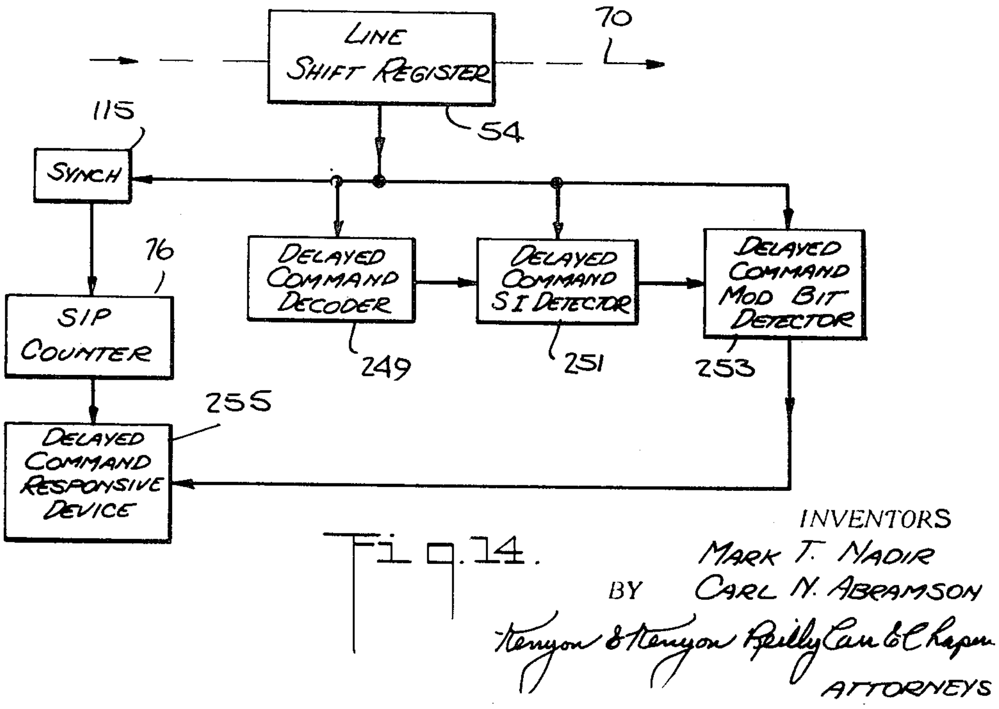
FIG. 14 is a block diagram of the circuitry for detecting DELAYED COMMAND information.

As mentioned previously, DELAYED COMMANDS are instructions to the system commanding the performance of specific actions or responses. FIG. 14 shows the circuitry for accomplishing the system response to DELAYED COMMANDS.

Specifically, a noncyclic code is sent out in the system behavior portion of the period (P) to identify the existence of a DELAYED COMMAND in the same period (P). This code is detected by a DELAYED COMMAND DECODER 249. The actual Delayed Command is sent out as a general SI in the text portion of the same period (P). This SI is ordinarily directed to general portions or to all of the system, and is received by the line shift register 54 and detected by a DELAYED COMMAND SI DETECTOR 251. SI Detector 251 is enabled by a signal from delayed command decoder 249 after such decoder 249 has detected the boxing signal indicating that a delayed command is to follow. The specific SIP (or SIPS) in the text portion of the period (P) in which the SI is located provides the implied meaning of the Delayed Command. This SIP location is detected by the synch circuit 115 and the SIP counter 76.

In addition to sending out the command information in the form of the general SI in a certain SIP location, a modification (MOD) bit can be added to the SI to increase the instructional set sent. Accordingly, a DELAYED COMMAND MOD BIT DETECTOR 253 receives the mod bit information and transfers the additional instructions to a DELAYED COMMAND RESPONSIVE DEVICE 255. Responsive device 255 also receives the Delayed Command instructions corresponding to the SIP count meaning and, with all the command information, produces the signals necessary to carry out the commands.

Where a three-level ternary logic system is employed, the MOD bit can be used with the DELAYED COMMAND to indicate:

1. this is the first one-third of the instruction;
2. this is the second one-third of the instruction; and
3. this is the last instruction.

In this manner, the MOD bit provides a multiplier on the DELAYED COMMAND.

The nature of the instruction sent by a DELAYED COMMAND may, for example, be the following:

1. PAT Unit XI, do----;
2. ALL PAT Units, do----;
3. A number X2 report----; etc.

Although the above description is directed to preferred embodiments of the invention, it is noted that other variations and modifications will be apparent to those skilled in the art and, therefore, may be made without departing from the spirit and scope of the present disclosure.

What is claimed is:

1. Method of communicating interactive statements for modifying system behavior between members of a system, comprising:

assigning message meanings individually to each of a multiplicity of discrete subperiods within a text portion of each of a series of periods (P);

at one or more locations of sending members, inserting into selected ones of said subperiods signals identifying receiving and/or sending members, each of said subperiods being selected where its assigned message meaning corresponds with the message meaning to be communicated;

assigning a system behavior portion to each of said periods (P) for communicating information relating to system behavior to which members of the system are responsive; and inserting signals in said system behavior portion, which signals operate to modify or change the implicit message meanings or the explicit meanings of said identifying signals inserted within the subperiods of the same or related periods (P);

whereby the receiving member may, in response to the signals within both said text portion and said system behavior portion, derive the message meanings corresponding to the selected subperiods and modify its behavior accordingly.

2. Method as recited in claim 1, further comprising assigning system behavior meanings individually to each of a plurality of clock positions within said system behavior portion of the period (P) so that the signals inserted in selected clock positions indicate the existence of corresponding system behavior statements.

3. Method as recited in claim 1, wherein said signals in the system behavior portion indicate the presence of command information for those members identified within the subperiods of the same or a subsequent period (P).

4. Method as recited in claim 1, further comprising detecting the signals within the system behavior portion and the text portion of the period (P), receiving the so-detected system behavior signals and the signals within the text portion, and changing the behavior of the system such that the message content of the signals within the subperiods is defined in accordance with the received system behavior information.

5. Method as recited in claim 1, wherein said identifying signals are inserted in subperiods having different message meanings than the subperiods corresponding to the proper message meanings, the difference being indicated by signals in the system behavior portion of the same period (P), whereby the receptor derives the proper message meanings from the received identification signals by detecting said system behavior signals.

6. Method as recited in claim 5, wherein said system behavior signals are cyclic codes which operate to change the implicit meaning of the identifying signals in the subperiods in cyclical fashion.

7. Method as recited in claim 1, wherein the number of message meanings assigned to the subperiods associated with a given period (P) is increased by combining a system behavior signal with the subperiod count, with at least one of said system behavior signals acting as a multiplier on said subperiod count, thereby generating an extending character set.

8. Method as recited in claim 1, wherein the complete number of signals identifying a receiving or sending member comprise the identifying signals inserted in a subperiod, and at least one of said system behavior signals.

9. Method as recited in claim 1, wherein at least one of the signals inserted in said system behavior portion of a period (P) indicates the priority level of the messages in the text portion of the same period (P).

10. Method as recited in claim 1, wherein at least one of the signals inserted in said system behavior portion of a period (P) indicates the sending or receiving status of the members identified in the subperiods of the same period (P), thereby defining the system mode of performance in said period (P).

11. Method as recited in claim 1, wherein at least one of the signals inserted in said system behavior portion of a period (P) indicates the specific area or group of members of the system to which the messages in the text portion of the same period (P) are directed.

12. Method as recited in claim 1, wherein at least one of the signals inserted in said system behavior portion of a period (P) indicates the presence or nature of a diagnostic system procedure, and the message meanings assigned to one or more subperiods in the text portion of the same period (P) define the specific diagnostic routine.

13. Method as recited in claim 1, wherein at least one of the signals inserted in said system behavior portion of a period (P) indicates the existence of a command, and the message meanings assigned to one or more subperiods in the text portion of the same period (P) define the specific command.

14. A system for communicating interactive statements for modifying system behavior between members of a system, comprising:

identification means for indicating reference points in each of a series of periods (P), said identification means providing for identification and recognition of each of a multiplicity of discrete subperiods within a text portion of each of said periods (P);

message-correlating means for associating each of a plurality of message meanings with respective ones of said subperiods;

signal-sending means, at one or more locations of sending members, for inserting into appropriate subperiods correlated with said message meanings signals identifying the sending and/or receiving members;

code generator means for producing system behavior signals to which members of the system respond;

code-sending means for inserting said system behavior signals into a system behavior portion of the period (P), which signals operate to modify or change the implicit message meanings or the explicit meanings of the identifying signals inserted within said subperiods; and decoding means, at one or more locations of receiving members, for detecting the signals inserted in both the system behavior portion and the text portion of the periods (P) and determining the complete message meaning of the signals in both of said portions.

15. A system as recited in claim 14, wherein said identification means includes counting means for producing count numbers indicative of the occurrence of each of said subperiods.

16. A system as recited in claim 15, wherein said message-correlating means associated each of said message meanings with respective ones of said subperiods by having means for converting a message meaning to a message-representative number correlated which is to the subperiod count number assigned to that message meaning.

17. A system as recited in claim 16, wherein there is additionally provided means for storing signals representative of said message meanings.

18. A system as recited in claim 17, wherein there is additionally provided comparator means for comparing the subperiod count numbers of available subperiods with the stored signals representing message meanings to be sent, whereby said comparator means enable said signal-sending means to insert, into appropriate subperiods, signals identifying the sending and/or receiving members.

19. A system as recited in claim 16, wherein said decoding means is connected to said message correlating means so that the signals detected within both said text portion and said system behavior portion are combined to derive the complete message meanings corresponding to the selected subperiods.

20. System as recited in claim 16, wherein said code generator means includes a counter in synchronism with said identification means, and output gates connected to selected output lines of said counter to provide cyclic code signals at predetermined counts, whereby said cyclic code signals are placed on the transmission line at selected count positions within the system behavior portion of the period (P).

21. System as recited in claim 16, wherein said code generator means includes an encoder which receives input command and control signals and generates code signals in response thereto, said code signals being inserted at predetermined count positions in the system behavior portion of the period (P).

22. System as recited in claim 16, wherein said decoding means includes count means for determining the specific position in the period (P) in which the coded system behavior signals are received.

23. System as recited in claim 22, wherein said decoding means also includes means for receiving from said identification means, signals indicating the count numbers of subperiods received.

24. System as recited in claim 16, wherein there is additionally provided a character modifier which is connected to receive system behavior signals from said decoding means and, in turn, applies modifying signals to the original character presented for sending, so that the original character is modified in a manner determined by the system behavior signals.

25. System as recited in claim 24, wherein said code generator means produces cyclic codes varying on a periodic basis so as to modify the original charaCter periodically in a predetermined manner as determined by the cyclic code.

26. System as recited in claim 16, wherein said code generator means is connected to said message-correlating means so as to modify the message representative number produced by said message-correlating means by an amount which is determined by the system behavior signals from said code generator means, whereby the modified message-representative number correlated to a subperiod count number is not exactly the same as the message-representative number attached to the original message meaning.

27. System as recited in claim 26, wherein said decoding means are employed at the receiving member's location to restore the received message-representative number to a message-representative number corresponding with the original message meaning.

28. System as recited in claim 16, wherein said code generator means produces system behavior signals acting as a multiplier on the subperiod count, said system behavior signals serving to extend the number of subperiods and, consequently, message meanings constituting a character set by combining the subperiod count with the system behavior signals in the same period (P).

29. A system as recited in claim 28, wherein said code generator means includes a subset generator for producing system behavior signals representing a portion of the message meaning sent by the signals in the text portion of the same period (P), whereby a complete message meaning is assembled by the decoding means at the receiving member's location by detecting the signals in both the text portion and the behavior portion of the period (P).

30. A system as recited in claim 29, wherein said subset generator is a cyclic code generator which produces system behavior signals which act as a multiplier on the subperiod count, thereby producing extended character sets.

31. A system as recited in claim 30, wherein, in the sending end, the cyclic code associated with the extended character set is compared in a cyclic code comparator with the detected cyclic codes on the line, and the subperiod count associated with a partial character is compared in a subperiod count comparator with the subperiod count on the line, and upon the matching in both of said comparators, signals identifying the sending and/or receiving member will be entered into the appropriate subperiod.

32. System as recited in claim 16, wherein said signal-sending means are adapted to send, in a subperiod, a signal identifying a portion of the address of the sending and/or receiving member, and said code generator means provides signals for insertion in the system behavior portion of the period (P) representing the remaining portion of the address, whereby the complete identification address of the sending or receiving member comprises both the system behavior signals and the partial identifying address.

33. A system as recited in claim 32, wherein there is provided a subperiod count comparator for comparing the subperiod count on the line with the subperiod count associated with the message meaning of the data for sending, and a code comparator for comparing the code signals in the system behavior portion of the period (P) with the system behavior signals representing a portion of the identifying address to be sent, the occurrence of a match in both of said comparators permitting signals representing the remaining portion of the identifying address to be entered into the appropriate subperiod on the line; and receiving circuits for said signals includes a system behavior signal decoder, an identifying address detector for detecting the incoming signals, and assembling means for combining said incoming signals into a complete identifying address of a sending and/or receiving member.

34. System as recited in claim 16, wherein said code generator means produces signals representing system priority levels of messages in a given period (P), said decoding means serve to detect said priority level signals in the system behavior portion of a period (P), and comparator means are provided for comparing the system priority level signals detected by said decoding means with the priority levels of the sender or receiver members, whereby said comparator means serves to permit or deny said members to enter signals onto the line.

35. System as recited in claim 34, wherein signals representing said priority levels of the members of the system are held by storage means.

36. System as recited in claim 34, further comprising HANDSHAKE start circuits connected to receive signals from said comparator means, said HANDSHAKE start circuits serving to permit or deny a member to engage in HANDSHAKING.

37. System as recited in claim 16, wherein said code generator means provides system behavior signals representing a system mode of performance to be used between communicating members with respect to the nature of the members identified by the signals in the text portion of the same period (P); said signal-sending means includes storage circuits for storing the identification addresses of the sending and/or one or more receiving members; and said decoding means includes a mode detector for receiving said system behavior signals, and selector means for selecting an identifying address from one or more of said storage circuits as determined by said received system behavior signals.

38. System as recited in claim 37, wherein there is provided a command unit for requesting a particular mode of performance for use between communicating members, said command unit connected to deliver command signals to said selector means.

39. System as recited in claim 16, wherein said code generator produces system behavior signals relating to a diagnostic procedure; and said decoding means includes both a diagnostic procedure command detector for receiving said system behavior signals, and an information-to-transpond detector for receiving signals in the text portion of the periods (P) representing diagnostic procedure information, said detected system behavior and text signals being applied to transducer means which in turn provides a diagnostic routine for transmittal.

40. System as recited in claim 39, wherein there is further provided a storage circuit for storing a diagnostic address for sending on the line in appropriate subperiods.

41. System as recited in claim 16, wherein said code generator provides system behavior signals corresponding to various diagnostic procedures for a given area or members of the system, the said specific area being determined by the identifying address signals inserted in the subperiods of the same period (P) having said diagnostic procedure signals, and said decoding means include means for detecting said system behavior signals and said identifying address signals.

42. System as recited in claim 16, wherein said code generator means includes a delayed command signal generator for producing system behavior signals identifying the existence of delayed commands in the text or subperiod portion of the period (P); and said decoding means includes both a delayed command decoder for detecting the presence of a delayed command code, and a delayed command identifying address detector for receiving the delayed command identifying address in the text portion of the same period (P); said identification means, said message-correlating means and said decoding means providing signals to a delayed command responsive device which in turn produces the signals necessary to carry out the received command.

* * * * *